United States Patent
Bunya et al.

(10) Patent No.: US 11,337,280 B2
(45) Date of Patent: May 17, 2022

(54) WIRELESS POWER TRANSFER SYSTEM

(71) Applicant: Mitsubishi Electric Corporation, Tokyo (JP)

(72) Inventors: Jun Bunya, Tokyo (JP); Ikuro Suga, Tokyo (JP); Miyuki Takeshita, Tokyo (JP); Hirohisa Kuwano, Tokyo (JP); Ryota Asakura, Tokyo (JP); Kazuhiro Kameoka, Fukaya (JP)

(73) Assignee: Mitsubishi Electric Corporation, Tokyo (JP)

( * ) Notice: Subject to any disclaimer, the term of this patent is extended or adjusted under 35 U.S.C. 154(b) by 326 days.

(21) Appl. No.: 16/612,489

(22) PCT Filed: Jul. 13, 2017

(86) PCT No.: PCT/JP2017/025522
§ 371 (c)(1),
(2) Date: Nov. 11, 2019

(87) PCT Pub. No.: WO2019/012643
PCT Pub. Date: Jan. 17, 2019

(65) Prior Publication Data
US 2020/0236741 A1 Jul. 23, 2020

(51) Int. Cl.
*H05B 6/12* (2006.01)
*H02J 50/80* (2016.01)
(Continued)

(52) U.S. Cl.
CPC ............ *H05B 6/1236* (2013.01); *H02J 50/10* (2016.02); *H02J 50/80* (2016.02); *H02J 50/90* (2016.02);
(Continued)

(58) Field of Classification Search
CPC .............. H05B 6/1236; H05B 2213/05; H05B 2213/06; H02J 50/80; H02J 50/90; H02J 50/10
(Continued)

(56) References Cited

U.S. PATENT DOCUMENTS

2015/0237682 A1* 8/2015 Yaman .................. A47J 27/002
219/624
2015/0257576 A1* 9/2015 Yorukoglu .............. A47J 36/00
99/331
(Continued)

FOREIGN PATENT DOCUMENTS

JP 2009-231039 A 10/2009
JP 2012-146423 A 8/2012
(Continued)

OTHER PUBLICATIONS

Extended European Search Report dated Jun. 29, 2020 issued in corresponding EP patent application No. 17917369.5.

*Primary Examiner* — Alfonso Perez Borroto
(74) *Attorney, Agent, or Firm* — Posz Law Group, PLC

(57) ABSTRACT

A wireless power transfer system includes an induction heating cooking apparatus including a heating coil that produces a high-frequency magnetic field, a power reception device including a power reception coil that receives power from the heating coil, a first communication device provided on the power reception device to transmit a communication signal, a second communication device provided above the induction heating cooking apparatus to receive the communication signal from the first communication device, and a notification unit that indicates whether the power reception coil is located within a predetermined region that is set in advance with respect to the heating coil, when the second (Continued)

communication device receives the communication signal from the first communication device.

9 Claims, 20 Drawing Sheets

(51) Int. Cl.
*H02J 50/90* (2016.01)
*H02J 50/10* (2016.01)
(52) U.S. Cl.
CPC ...... *H05B 2213/05* (2013.01); *H05B 2213/06* (2013.01)
(58) Field of Classification Search
USPC .......................................... 219/624
See application file for complete search history.

(56) References Cited

U.S. PATENT DOCUMENTS

2020/0085225 A1* 3/2020 Kim .................. H05B 6/06
2020/0205240 A1   6/2020 Lee

FOREIGN PATENT DOCUMENTS

| JP | 2016-197609 A | 11/2016 |
| WO | 2013/182406 A1 | 12/2013 |
| WO | 2014/030314 A1 | 2/2014 |
| WO | 2017/026646 A1 | 2/2017 |

* cited by examiner

WIRELESS POWER TRANSFER SYSTEM

CROSS REFERENCE TO RELATED APPLICATION

This application is a U.S. national stage application of PCT/JP2017/025522 filed on Jul. 13, 2017, the contents of which are incorporated herein by reference.

TECHNICAL FIELD

The present invention relates to a wireless power transfer system including an induction heating cooking apparatus that transfers power to a power reception device.

BACKGROUND ART

An existing wireless power transfer systems include a wireless power reception device and an induction heating device. The induction heating cooking apparatus includes a heating coil below a top plate. The wireless power reception device includes a power reception coil. The power reception coil is wirelessly supplied with power from the heating coil through electromagnetic induction, when the wireless power reception device is placed on the top plate. The induction heating cooking apparatus also includes a power-reception-device detection unit to detect the wireless power reception device placed on the top plate (see, for example, Patent Literature 1).

CITATION LIST

Patent Literature

Patent Literature 1: International Publication No. 2014/030314

SUMMARY OF INVENTION

Technical Problem

A wireless power transfer system described in Patent Literature 1 includes a power-reception-device detection unit that includes a Hall element and is located below a top plate of an induction heating cooking apparatus. A power reception device includes a power-reception-device transmitting unit including a magnet. The power-reception-device detection unit detects a magnetic field generated by the power-reception-device transmitting unit to thereby detect the position of the power reception device.

However, the above wireless power transfer system has the following problem. Since the power-reception-device detection unit is provided below the top plate of the induction heating cooking apparatus, the power-reception-device unit is deteriorated by heat propagating to the top plate from an object being heated and heat generated from a heating coil, thus causing the position of the power reception device to be erroneously detected.

The present invention has been made to solve the above problem, and aim to provide a wireless power transfer system that can prevent erroneous detection of the position of a power reception device placed on an induction heating cooking apparatus.

Solution to Problem

A wireless power transfer system according to an embodiment of the present invention includes an induction heating cooking apparatus including a heating coil that produces a high-frequency magnetic field, a power reception device including a power reception coil that receives power from the heating coil, a first communication device provided on the power reception device to transmit a communication signal, a second communication device provided above the induction heating cooking apparatus to receive the communication signal from the first communication device, and a notification unit that indicates whether the power reception coil is placed within a predetermined region that is set in advance with respect to the heating coil, when the second communication device receives the communication signal from the first communication device.

Advantageous Effects of Invention

The wireless power transfer system according to the embodiment of the present invention indicates whether the power reception coil is located within the predetermined region, when the second communication device provided above the induction heating cooking apparatus receives a communication signal from the first communication device.

Because of provision of the above configuration, it is possible to prevent erroneous detection of the position of the power reception device placed on the induction heating cooking apparatus.

DESCRIPTION OF EMBODIMENTS

Embodiment 1

Entire Configuration

Figure 1:
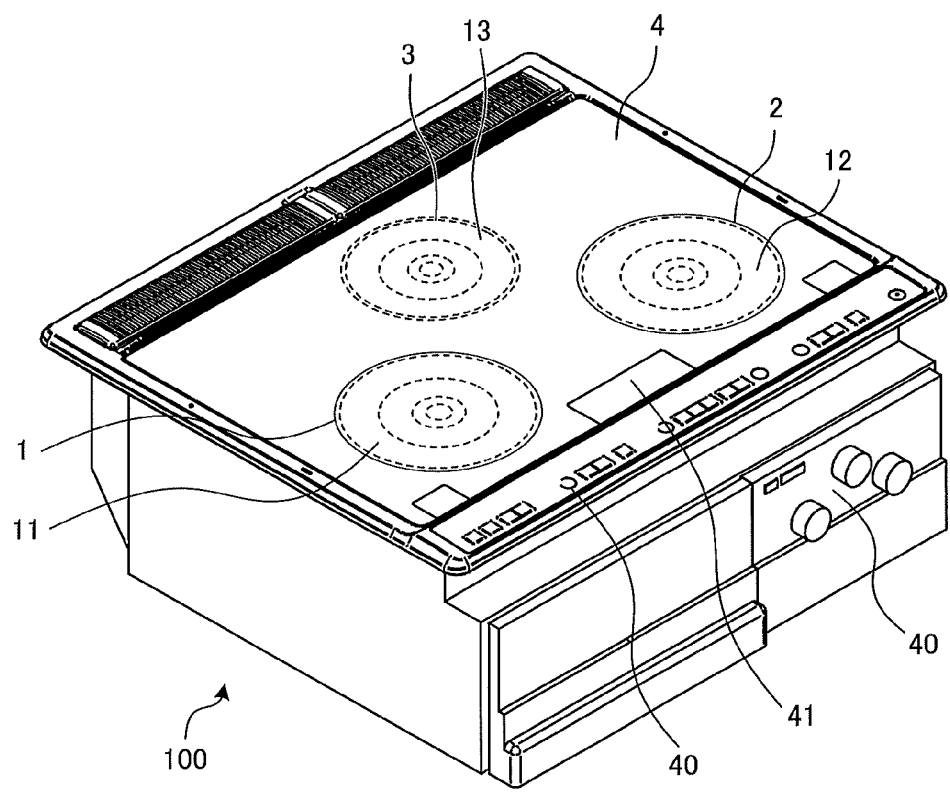
FIG. 1 is a perspective view illustrating the configuration of an induction heating cooking apparatus according to Embodiment 1 of the present invention.

FIG. 1 is a perspective view illustrating the configuration of an induction heating cooking apparatus according to Embodiment 1 of the present invention.

As illustrated in FIG. 1, an induction heating cooking apparatus 100 includes, at its top, a top plate 4 on which a target object to be heated such as a pot is placed. On the top plate 4, a power reception device 200 (see FIG. 2) is detachably placed on the top plate 4. The power reception device 200 receives power transferred from the induction heating cooking apparatus 100.

Below the top plate 4, a first heating coil 11, a second heating coil 12, and a third heating coil 13 are provided. The first heating coil 11, the second heating coil 12, and the third heating coil 13 are each formed by winding a conductive wire made of an insulated metal. The conductive wire may be made of any metal such as copper or aluminum. For example, the first heating coil 11, the second heating coil 12, and the third heating coil 13 are each made up of plural coils concentrically arranged. In the following description, in the case where the first heating coil 11, the second heating coil 12, and the third heating coil 13 are not distinguished from each other, the first heating coil 11, the second heating coil 12, and the third heating coil 13 will be each referred to as heating coil.

Each of the heating coils produces a high-frequency magnetic field when supplied with a high-frequency current from an inverter circuit 50, which will be described later. The induction heating cooking apparatus 100 thus inductively heats a target object to be heated that is placed on the top plate 4. The induction heating cooking apparatus 100 serves as a wireless transfer apparatus that transfers power to the power reception device 200 placed on the top plate 4.

The top plate 4 has a first heating zone 1, a second heating zone 2, and a third heating zone 3 that are provided in association with respective heating ranges of the first heating coil 11, the second heating coil 12, and the third heating coil 13. In the following description, in the case where the first heating zone 1, the second heating zone 2, and the third heating zone 3 are not distinguished from each other, the first heating zone 1, the second heating zone 2, and the third heating zone 3 will be each referred to as heating zone.

In each of the heating zones, a circular position-indication indicating a position where the target object or the power reception device 200 is to be placed is provided by paint coating, printing, or other methods. The positions of the heating coils and the heating zones are not limited to such positions as explained above. Furthermore, each of the number of heating coils and the number of heating zones is not limited to three, and may be arbitrarily determined.

A main-body operating unit 40 is provided on a front side of a main body of the induction heating cooking apparatus 100 and a front side of a top surface of the top plate 4. The main-body operating unit 40 serves as an input device for use in setting power to be supplied in heating the target object by use of the first heating coil 11, the second heating coil 12, and the third heating coil 13, and also for use in setting a cooking menu. The main-body operating unit 40 includes, for example, a mechanical switch such as a push switch or a tactile switch, or a touch switch that detects an input operation based on a change in the capacitance of an electrode.

A main-body display unit 41 is provided in a front area of the top surface of the top plate 4. The main-body display unit 41 displays an operating state of the induction heating cooking apparatus 100, information regarding an input operation from the main-body operating unit 40 and information regarding an operation that is input from the main-body operating unit 40, thus notifying the user of such information. The main-body display unit 41 includes, for example, a liquid crystal device (LCD) or a light emitting diode (LED).

Figure 2:
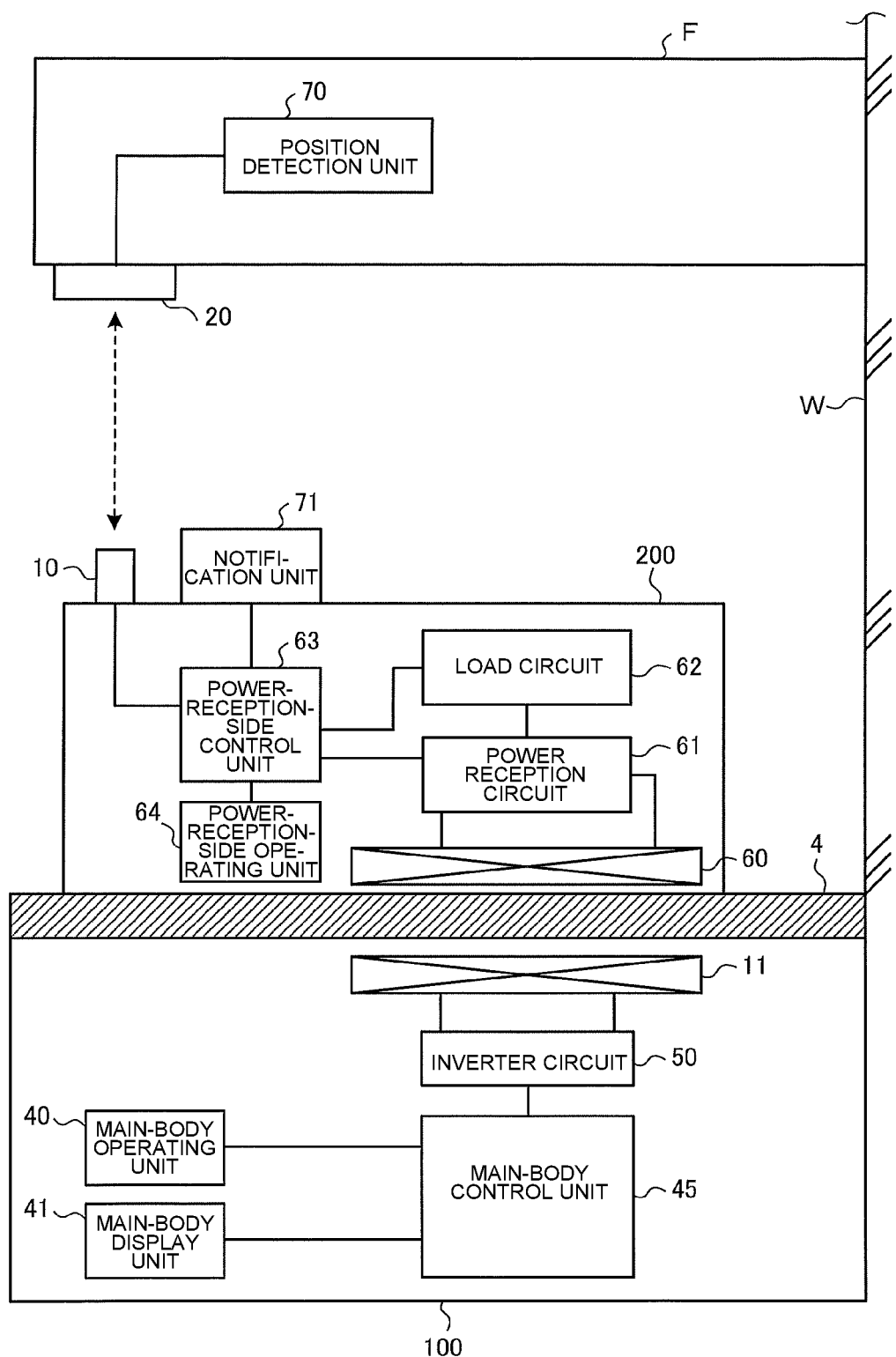
FIG. 2 is a block diagram illustrating the configuration of the wireless power transfer system according to Embodiment 1 of the present invention.

FIG. 2 is a block diagram illustrating the configuration of a wireless power transfer system according to Embodiment 1 of the present invention. FIG. 2 illustrates a state in which the power reception device 200 is placed on the first heating zone 1 of the induction heating cooking apparatus 100.

As illustrated in FIG. 2, the wireless power transfer system includes the induction heating cooking apparatus 100, the power reception device 200, a first communication device 10, a second communication device 20, a position detection unit 70, and a notification unit 71.

The inverter circuit 50 is provided in the induction heating cooking apparatus 100 to supply a high-frequency current to the first heating coil 11. The inverter circuit 50 is connected to an alternating-current power supply via a rectifier circuit. The inverter circuit 50 converts direct-current power input from the rectifier circuit into, for example, alternating-current power with a high frequency of approximately 20 to 100 kHz, and outputs the alternating-current power to the heating coil.

Also, a main-body control unit 45 is provided in the induction heating cooking apparatus 100 to control the overall operation of the induction heating cooking apparatus 100 including the inverter circuit 50. The main-body control unit 45 includes, for example, a microcomputer or a digital signal processor (DSP). The main-body control unit 45 controls the inverter circuit 50 based on information regarding an operation from the main-body operating unit 40 or other information. The main-body control unit 45 causes the main-body display unit 41 to display information based on, for example, the operating state of the induction heating cooking apparatus 100.

The power reception device 200 is, for example, a cooking apparatus such as a fryer, a steamer, a roaster, or a toaster. Alternatively, the power reception device 200 is, for example, a cooking apparatus for use in pre-cooking preparations, pre-cooking processing, or other purposes, such as a blender, a mixer, a mill, a whisk, or a food processor.

The power reception device 200 includes a power reception coil 60, a power reception circuit 61, a load circuit 62, a power-reception-side control unit 63, and a power-reception-side operating unit 64.

The power reception coil 60 is formed by winding a conductive wire made of an insulated metal. The conductive wire may be made of an arbitrarily selected kind of metal, for example, copper or aluminum. For example, as seen in plan view, the power reception coil 60 has substantially the same shape as the heating coil of the induction heating cooking apparatus 100. The power reception coil 60 receives power from the heating coil through electromagnetic induction or magnetic coupling when the power reception device 200 is placed on the top plate 4.

In power transfer using magnetic resonance, the amount of reduction of the power reception efficiency at the time of increasing the distance between the heating coil and the power reception coil 60 is smaller than that in power transfer using electromagnetic induction. In other words, in the power transfer using magnetic resonance, power can be transferred by a great distance. In power transfer using electromagnetic induction, the distance by which power is transferred is small, but a reception efficiency is high. That is, in power transfer using electromagnetic induction, power can be transferred with a high efficiency. The power reception efficiency in power transfer means the ratio of power received by the power reception coil 60 to the power supplied to the heating coil.

The power reception circuit 61 rectifies and smooths power received by the power reception coil 60. The load circuit 62 is connected to an output side of the power reception circuit 61 and is supplied with power from the power reception circuit 61. The power-reception-side control unit 63 controls the overall operation of the power reception device 200 including the power reception circuit 61 and the load circuit 62. The power-reception-side operating unit 64 inputs, for example, an instruction for operations to start and stop the supply of power to the power reception device 200, and a set value for power to be supplied to the load circuit 62.

The power reception device 200 is placed on the top plate 4 of the induction heating cooking apparatus 100 to wirelessly receive power from the induction heating cooking apparatus 100. That is, high frequency power is supplied by the inverter circuit 50 to the first heating coil 11 located under the top plate 4 of the induction heating cooking apparatus 100, whereby a high-frequency magnetic field is produced from the first heating coil 11. The high-frequency magnetic field is received by the power reception coil 60 provided in the power reception device 200, and power is supplied to the load circuit 62.

In the case where the load circuit 62 is a heater load, the power-reception-side control unit 63 of the power reception device 200 controls the power reception circuit 61 such that power received by the power reception coil 60 is supplied to the load circuit 62 as alternating-current power without any processing. In the case where for example, the load circuit 62 is a motor load, the power-reception-side control unit 63 controls the power receiving circuit 61 such that power received by the power reception coil 60 is rectified and smoothed, and converted into an arbitrarily determined alternating-current power by an inverter circuit or another component, and the alternating-current power is then supplied to the load circuit 62. That is, in the case where the load circuit 62 is a motor load, the load circuit 62 is driven at a variable speed. It should be noted that direct current may be rectified and smoothed, and applied to the heater load.

The first communication device 10 is a communication device that wirelessly communicates with the second communication device 20. The first communication device 10 includes, for example, an infrared light emitting element and an infrared light receiving element, and transmits and receives a communication signal to and from the second communication device 20 through infrared communication. The first communication device 10 transmits a communication signal upwardly that is infrared radiation.

The first communication device 10 is provided on the power reception device 200. For example, the first communication device 10 is attached to the top surface of the housing of the power reception device 200.

The second communication device 20 is a communication device that wirelessly communicates with the first communication device 10. The second communication device 20 includes, for example, an infrared light emitting element and an infrared light receiving element, and transmits and receives a communication signal to and from the first communication device 10 through infrared communication. The second communication device 20 transmits a communication signal downwardly that is infrared radiation.

The second communication device 20 is provided above the induction heating cooking apparatus 100. For example, the second communication device 20 is attached to the housing of a ventilating fan F provided above the induction heating cooking apparatus 100. The ventilating fan F is attached to a wall W, a ceiling, or other portions of a room in which the induction heating cooking apparatus 100 is installed.

The position detection unit 70 is provided in the housing of the ventilating fan F located above the induction heating cooking apparatus 100. The position detection unit 70 includes a microcomputer, a digital signal processor (DSP), or other components.

The position detection unit 70 determines, based on a communication signal received by the second communication device 20, whether the power reception coil 60 is located in a predetermined region that is set in advance with respect to the heating coil. The position detection unit 70 also causes the second communication device 20 to transmit information on the result of the above determination.

The notification unit 71 indicates information on the result of the determination made by the position detection unit 70. To be more specific, when the second communication device 20 receives a communication signal from the first communication device 10, the notification unit 71 indicates whether or not the power reception coil 60 is located within the predetermined region set in advance with respect to the heating coil.

The notification unit 71 is provided on, for example, the power reception device 200. The notification unit 71 acquires, via the power-reception-side control unit 63, information received by the first communication device 10 and indicating the result of the determination made by the position detection unit 70, and indicates the result of the determination by the position detection unit 70.

The notification unit 71 is a display device such as an LCD or an LED, and indicates information by, for example, displaying a character or characters or a symbol or symbols, and turning on/off light. Also, for example, the notification unit 71 is an audio device such as a speaker or a buzzer, and indicating information with sound such as a voice message or a buzzer.

Configuration of Second Communication Device 20

Figure 3:
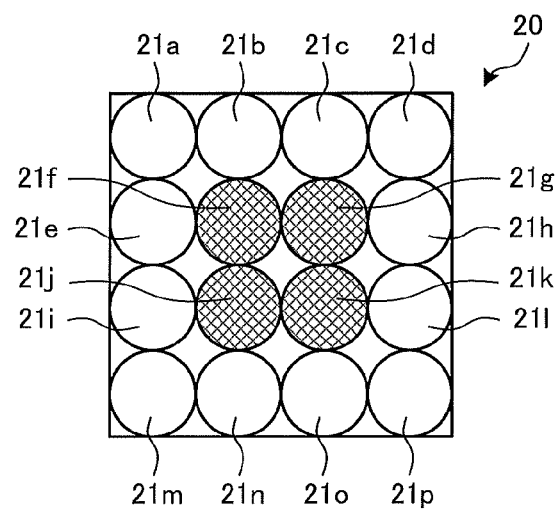
FIG. 3 schematically illustrates the configuration of a second communication device of the wireless power transfer system according to Embodiment 1 of the present invention.

FIG. 3 schematically illustrates the configuration of the second communication device of the wireless power transfer system according to Embodiment 1 of the present invention. FIG. 3 is a schematic plan view of the second communication device 20 as seen from the induction heating cooking apparatus 100.

As illustrated in FIG. 3, the second communication device 20 includes plural receiving units 21a to 21p. Each of the receiving units 21a to 21p is an infrared light receiving element that is an infrared sensor, and receives infrared radiation transmitted from the first communication device 10. As seen in plan view, the plural receiving units 21a to 21p are arranged in four columns and four rows. That is, the second communication device 20 includes a compound-eye infrared sensor module made up of 16 infrared light receiving elements.

Although the following description of Embodiment 1 will be made with respect to a configuration in which the second communication device 20 includes 16 receiving units 21a to 21p, Embodiment 1 of the present invention is not limited to this configuration. The second communication device 20 may include an arbitrarily determined number of receiving units. It is not indispensable that the receiving units 21a to 21p of the second communication device 20 are arranged in four rows and four columns, that is, the receiving units may be arranged in an arbitrarily determined manner.

Location of Second Communication Device 20

Figure 4:
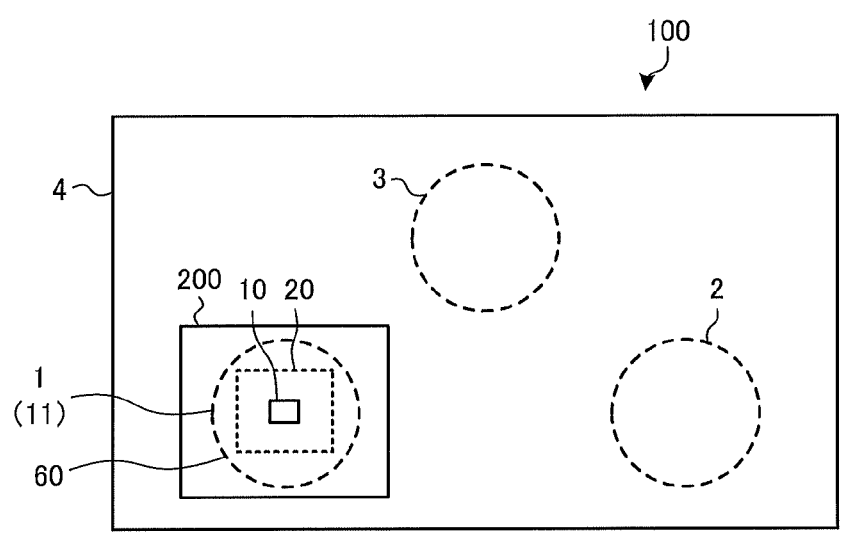
FIG. 4 is a plan view indicating the location of the second communication device in the wireless power transfer system according to Embodiment 1 of the present invention.

FIG. 4 is a plan view indicating the location of the second communication device in the wireless power transfer system according to Embodiment 1 of the present invention. FIG. 4 schematically illustrates the case where the power reception device 200 is placed on the first heating zone 1 of the induction heating cooking apparatus 100.

As illustrated in FIG. 4, when the power reception coil 60 of the power reception device 200 is located just above the first heating coil 11 of the induction heating cooking apparatus 100, the second communication device 20 covers the first communication device 10 as seen in plan view. For example, when the power reception coil 60 is located just above the first heating coil 11, the second communication device 20 is located such that a center position of a region in which the plural receiving units 21a to 21p are arranged is located just above the first communication device 10.

Position Detection Operation

A position detection operation of the position detection unit 70 will be described.

When a predetermined receiving unit or units 21, that is, one or ones of the plural receiving units 21a to 21p, receive a communication signal, the position detection unit 70 determines that the power reception coil 60 is located within the predetermined region set in advance with respect to the heating coil.

The above predetermined region is a positional range in which the power reception coil 60 is located such that the amount of reduction of the power reception efficiency in power transfer falls within an allowable range.

It should be noted that in the case of transferring power from the heating coil of the induction heating cooking apparatus 100 to the power reception coil 60 of the power reception device 200, there is a position at which the power reception coil 60 is located with respect to the heating coil such that power can be transferred with the maximum power reception efficiency. To be more specific, in the case where the power reception coil 60 is located just above the heating coil, the distance between the heating coil and the power reception coil 60 is the shortest, and the power reception efficiency in power transfer is thus the maximum. However, if the power reception coil 60 is displaced from the heating coil, the larger the amount of the displacement, the larger the amount of reduction of the power reception efficiency in power transfer, as a result of which the amount of power that is supplied from the heating coil to the power reception coil 60 is further reduced.

For instance, in the case where the maximum amount by which the power reception coil 60 is displaced from the heating coil such that the amount of reduction of the power reception efficiency in power transfer falls within the allowable range is 15 mm, a receiving unit or units that are located within a circle having a radius of 15 mm from the center position of the region in which the plural receiving units 21a to 21p are arranged are determined as the predetermined receiving unit or units 21.

A specific example of the position detection operation of the position detection unit 70 will be described on the assumption that in an example illustrated in FIG. 3, the receiving unit 21f, the receiving unit 21g, the receiving unit 21j, and the receiving unit 21k are the predetermined receiving units 21.

As illustrated in FIG. 4, in the case where the power reception device 200 is placed at a position such that the power reception coil 60 is located just above the first heating coil 11, the receiving unit 21f, the receiving unit 21g, the receiving unit 21j, or the receiving unit 21k of the second communication device 20 receives a communication signal from the first communication device 10. When at least one of the receiving unit 21f, the receiving unit 21g, the receiving unit 21j, and the receiving unit 21k receives the communication signal, the position detection unit 70 determines that the power reception coil 60 is located within the predetermined region set in advance with respect to the first heating coil 11.

Figure 5:
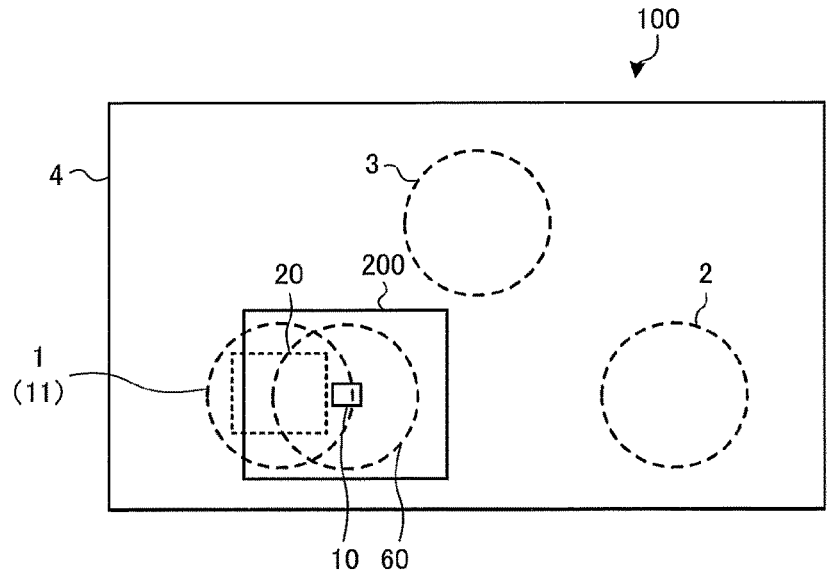
FIG. 5 is a plan view for use in describing a position detection operation of the wireless power transfer system according to Embodiment 1 of the present invention.

FIG. 5 is a plan view for use in describing the position detection operation of the wireless power transfer system according to Embodiment 1 of the present invention. FIG. 5 schematically illustrates the power reception device 200 placed on the first heating zone 1 of the induction heating cooking apparatus 100.

As illustrated in FIG. 5, in the case where the power reception device 200 is placed at a position such that the power reception coil 60 is offset from the first heating coil 11, the first communication device 10 provided on the power reception device 200 is also offset from the second communication device 20 as seen in plan view.

In this case, none of the receiving unit 21f, the receiving unit 21g, the receiving unit 21j, and the receiving unit 21k, which are included in the plural receiving units 21a to 21p, receives a communication signal from the first communication device 10. Since this falls under the case where at least one of the receiving unit 21f, the receiving unit 21g, the receiving unit 21j, and the receiving unit 21k does not receive a communication signal, the position detection unit 70 determines that the power reception coil 60 is not located within the predetermined region set in advance with respect to the first heating coil 11.

It should be noted that the second communication device 20 is provided with receiving units other than the receiving unit 21f, the receiving unit 21g, the receiving unit 21j, and the receiving unit 21k. Thus, even when the power reception coil 60 is not located within the predetermined region set in advance with respect to the first heating coil 11, the second communication device 20 can receive a communication signal from the first communication device 10.

Whether the power reception coil 60 is located within the predetermined region or not may be determined based on which one of the receiving unit 21f, the receiving unit 21g, receiving unit 21j, and the receiving unit 21k has received infrared radiation with the greatest reception strength, among the plural receiving units 21a to 21p.

The position detection unit 70 may determine, in the case where at least one of the plural receiving units 21a to 21p has received a communication signal from the first communication device 10, that the power reception coil 60 is located within the predetermined region set in advance with respect to the heating coil. That is, all the plural receiving units 21a to 21p may be set as the predetermined receiving units 21.

The power-reception-side operating unit 64 corresponds to "operating unit" in the present invention.

The main-body control unit 45 corresponds to "controller" in the present invention.

Position Determination Notifying Operation

A position determination operation of the wireless power transfer system according to Embodiment 1 will be described.

Figure 6:
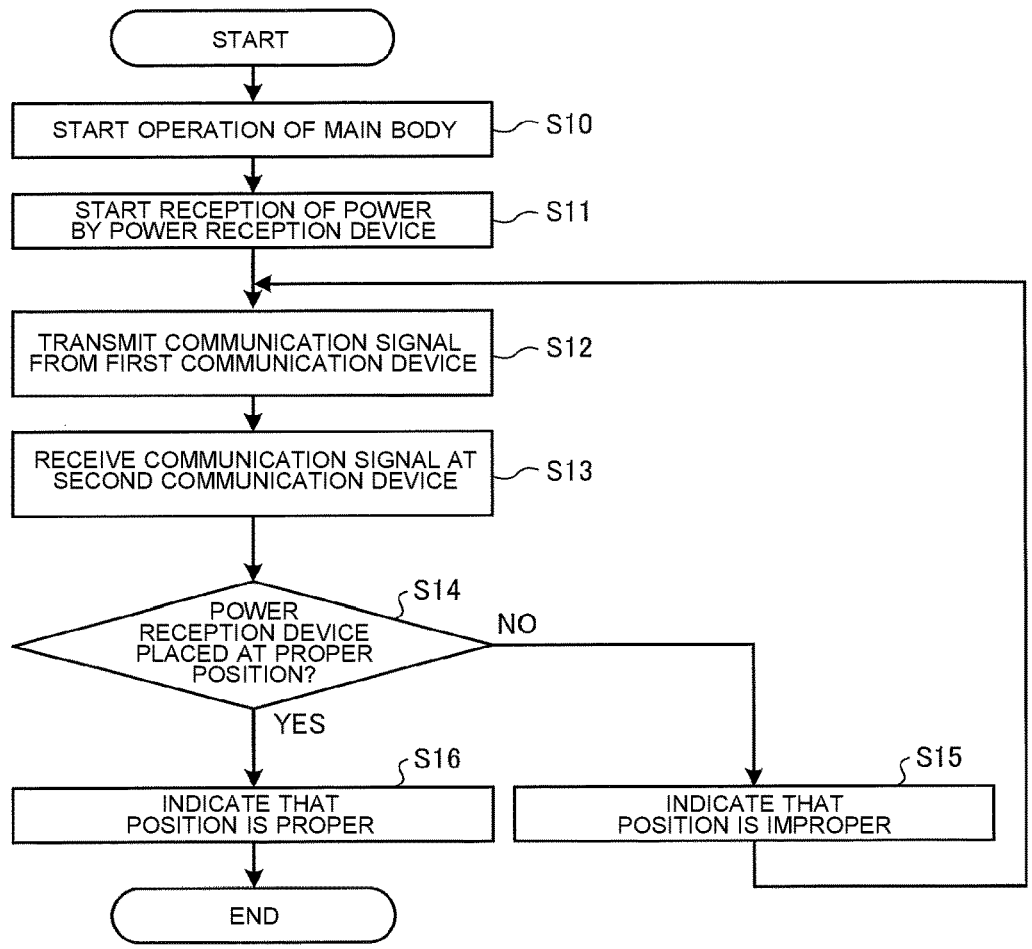
FIG. 6 is a flowchart indicating a position determination operation of the wireless power transfer system according to Embodiment 1 of the present invention.

FIG. 6 is a flowchart indicating a position determination operation of the wireless power transfer system according to Embodiment 1 of the present invention. The steps as indicated in FIG. 6 will be described.

First, a user places the power reception device 200 on the top plate 4 of the induction heating cooking apparatus 100. From the main-body operating unit 40 provided on the front side of the induction heating cooking apparatus 100, the user performs an input operation to cause the power reception device 200 to start operating.

The main-body control unit 45 drives the inverter circuit 50 to supply the heating coil with power for a control power supply (step S10). The power reception coil 60 of the power reception device 200 receives power from the heating coil. The power received by the power reception coil 60 is supplied to the power-reception-side control unit 63 via the power reception circuit 61. This causes the power-reception-side control unit 63 to be in a standby state in which the power-reception-side control unit 63 is ready to operate (step S11). It should be noted that the power for the control power supply is power that is smaller than power in a state in which the load circuit 62 of the power reception device 200 is in operation.

Then, the power-reception-side control unit 63 causes the first communication device 10 to transmit a communication signal. The first communication device 10 transmits the communication signal upwardly that is infrared radiation (step S12). It should be noted that the communication signal transmitted by the first communication device 10 may include information indicating a position determination notifying operation.

In the second communication device 20 provided above the induction heating cooking apparatus 100, any one of the plural receiving units 21a to 21p receives the communication signal from the first communication device 10 (step S13).

The position detection unit 70 determines, through the above position detection operation, whether the power reception coil 60 is located within the predetermined region set in advance with respect to the heating coil or not. That is, the position detection unit 70 determines whether the power reception device 200 is placed at a proper position or not (step S14). The position detection unit 70 may perform a position detection operation only in the case where the communication signal received by the second communication device 20 includes information indicating the position determination notifying operation.

In the case where the power reception coil 60 is not located within the predetermined region set in advance with respect to the heating coil, the position detection unit 70 causes the second communication device 20 to transmit a communication signal including information indicating that the power reception device 200 is not located at a proper position. The first communication device 10 receives the communication signal from the second communication device 20. The power-reception-side control unit 63 causes the notification unit 71 to indicate the information acquired from the first communication device 10 and indicating that the power reception device 200 is not placed at a proper position (step S15). That is, when the second communication device 20 receives the communication signal from the first communication device 10, the notification unit 71 indicates whether the power reception coil 60 is located within the predetermined region set in advance with respect to the heating coil or not.

After step S15, the process of the power-reception-side control unit 63 returns to step S12, and the power-reception-side control unit 63 repeats the above operation.

Because of the indication by the notification unit 71, the user recognizes that the power reception device 200 is not placed at a proper position, and thus moves the power reception device 200 to a proper position.

In step S14, in the case where it is determined that the power reception coil 60 is located within the predetermined region set in advance with respect to the heating coil, the position detection unit 70 causes the second communication device 20 to transmit a communication signal including information indicating that the power reception device 200 is placed at a proper position. The first communication device 10 receives the communication signal from the second communication device 20. The power-reception-side control unit 63 causes the notification unit 71 to indicate the information acquired from the first communication device 10 and indicating that the power reception device 200 is placed at a proper position (step S16). In other words, when the second communication device 20 receives the communication signal from the first communication device 10, the notification unit 71 indicates whether the power reception coil 60 is located within the predetermined region set in advance with respect to the heating coil or not.

After step S16, the power-reception-side control unit 63 ends the position determination notifying operation.

Because of the indication by the notification unit 71, the user recognizes that the power reception device 200 is placed at a proper position, and proceeds to an operation to cause the power reception device 200 to start the operation thereof.

The power-reception-side control unit 63 may determine, after causing the first communication device 10 to transmit a communication signal in step S12, whether a communication signal is received from the second communication device 20 within a predetermined time period or not. In the case where, within a predetermined period of time, the power-reception-side control unit 63 fails to receive from the second communication device 20, a communication signal including information indicating whether the power reception device 200 is placed at a proper position or not, the power-reception-side control unit 63 may cause the notification unit 71 to indicate information indicating that the power reception device 200 is not placed at a proper position.

The position detection unit 70 may determine a more detailed position of the power reception device 200, based on which one of the plural receiving units 21*a* to 21*p* has received infrared radiation with the greatest reception strength. In this case, the notification unit 71 may indicate a more detailed position of the power reception device 200. For instance, in the example as illustrated in FIG. 3, if the receiving unit 21*a* receives infrared radiation with the greatest reception strength, the position detection unit 70 determines that the first communication device 10 is located just below the receiving unit 21*a*. That is, the position detection unit 70 determines that the power reception device 200 on the top plate 4 is displaced toward a rear side and a right side of the top plate 4. The power-reception-side control unit 63 causes the notification unit 71 to indicate information indicating that the power reception device 200 on the top plate 4 is displaced toward the rear side and right side of the top plate 4.

As described above, in Embodiment 1, the second communication device 20 is provided above the induction heating cooking apparatus 100, and receives a communication signal from the first communication device 10. When the second communication device 20 receives the communication signal from the first communication device 10, the notification unit 71 indicates whether the power reception coil 60 is located within the predetermined region set in advance with respect to the heating coil or not.

It is therefore possible to prevent erroneous detection of the position of the power reception device 200 placed on the induction heating cooking apparatus 100.

Also, the user can be notified of the proper position of the power reception device 200. Thereby, it is possible to indicate that the power reception device 200 is placed at a proper position where power is received such that the amount of reduction of the power reception efficiency in power transfer falls within the allowable range. Thus, it is possible to prevent great reduction of the power reception efficiency in transferring power from the induction heating cooking apparatus 100 to the power reception device 200. Therefore, a sufficient performance of the power reception device 200 can be ensured, and the usability of the wireless power transfer system can be improved.

Heat generated in the induction heating cooking apparatus 100 does not easily propagate to the second communication device 20 or the position detection unit 70. Therefore, deterioration of these components can be reduced as compared with the technique described in Patent Literature 1. Since it is not necessary to provide plural Hall elements under the top plate 4 to detect the position of the power reception device 200, it is possible to reduce the manufacturing cost as compared with the technique described in Patent Literature 1.

Furthermore, in Embodiment 1, the second communication device 20 includes the plural receiving units 21*a* to 21*p*. When a predetermined one of the plural receiving units 21 receives a communication signal, the position detection unit 70 causes the notification unit 71 to indicate that the power reception coil 60 is located within the predetermined region.

It is thus possible to indicate that the power reception device 200 is placed at a proper position where the power reception device 200 receives power such that the amount of reduction of the power reception efficiency in power transfer falls within the allowable range. Furthermore, even in the case where the power reception coil 60 is not located within the predetermined region set in advance with respect to the heating coil, the second communication device 20 can receive a communication signal from the first communication device 10. Therefore, it is possible to improve the usability for the user.

In Embodiment 1, the first communication device 10 transmits a communication signal upwardly that is infrared radiation. Infrared radiation has frequencies higher than the frequencies in the 2.4 GHz band or 5 GHz band for use in Wi-Fi (registered trademark) and the frequencies in the 2.4 GHz band for use in Bluetooth (registered trademark). Thus, the directivity of infrared radiation transmitted from the first communication device 10 is higher than that of radio waves transmitted in the Wi-Fi (registered trademark) or Bluetooth (registered trademark) communication system.

Therefore, since the second communication device 20 receives infrared radiation from the first communication device 10, the position of the power reception device 200 can be detected with a high accuracy.

Although the above description of Embodiment 1 refers to a configuration in which power is transferred to the power reception coil 60 from the heating coil that performs induction heating, the configuration provided in Embodiment 1 of the present invention is not limited to this configuration. A power transfer coil for use in transferring power to the power reception coil 60 of the power reception device 200 may be provided separately from the heating coil.

Modification 1

Although the above description refers to a configuration in which a single power reception device 200 is provided with a single first communication device 10 and a single second communication device 20, the configuration of Embodiment 1 of the present invention is not limited to such a configuration. The single power reception device 200 may be provided with plural pairs of first communication devices 10 and second communication devices 20.

Figure 7:
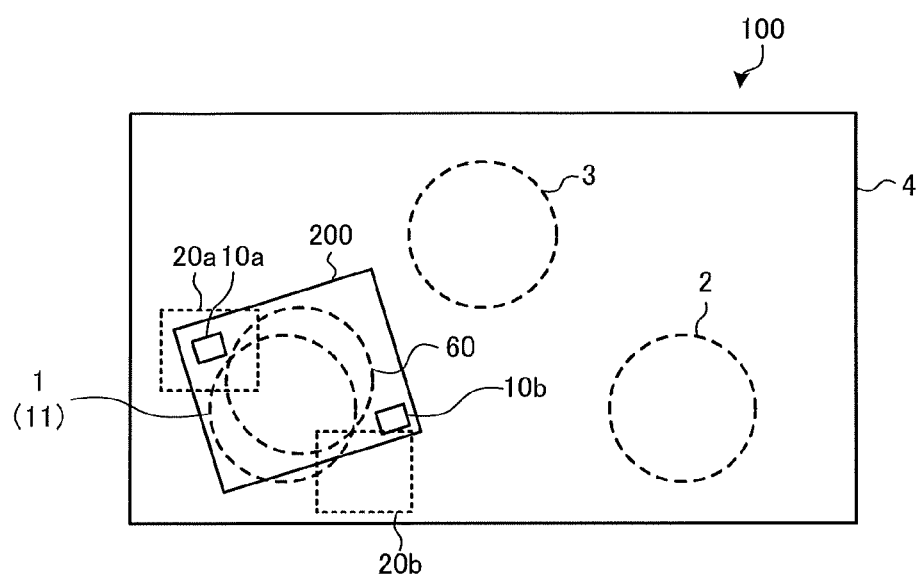
FIG. 7 is a plan view of Modification 1 of the wireless power transfer system according to Embodiment 1 of the present invention.

FIG. 7 is a plan view of Modification 1 of the wireless power transfer system according to Embodiment 1 of the present invention.

As illustrated in FIG. 7, for a single power reception device 200, a first communication device 10*a* and a first communication device 10*b* are provided at different positions. A second communication device 20*a* is located at a position corresponding to the first communication device 10*a* in the case where the power reception device 200 is placed at a proper position. A second communication device 20*b* is located at a position corresponding to the first communication device 10*b* in the case where the power reception device 200 is placed at a proper position.

Because of the above configuration, the position detection unit 70 can accurately determine whether the power reception device 200 is placed at a proper position.

To be more specific, in the case where as illustrated in FIG. 7, the power reception device 200 is placed in such a manner as to be oriented obliquely with respect to the top plate 4, the power reception coil 60 may be offset from the first heating coil 11 even in the case where the second communication device 20a receives a communication signal from the first communication device 10a. In such a case, the second communication device 20b does not receive a communication signal from the first communication device 10b, and the position detection unit 70 can thus determine that the power reception device 200 is not placed at a proper position.

Furthermore, in the case where only one or some of the plural second communication devices 20 receive a communication signal from the first communication device 10, it is possible to determine that the power reception device 200 is not properly oriented.

Modification 2

It is described above that the notification unit 71 is provided on the power reception device 200. This, however, is not limitative.

Figure 8:
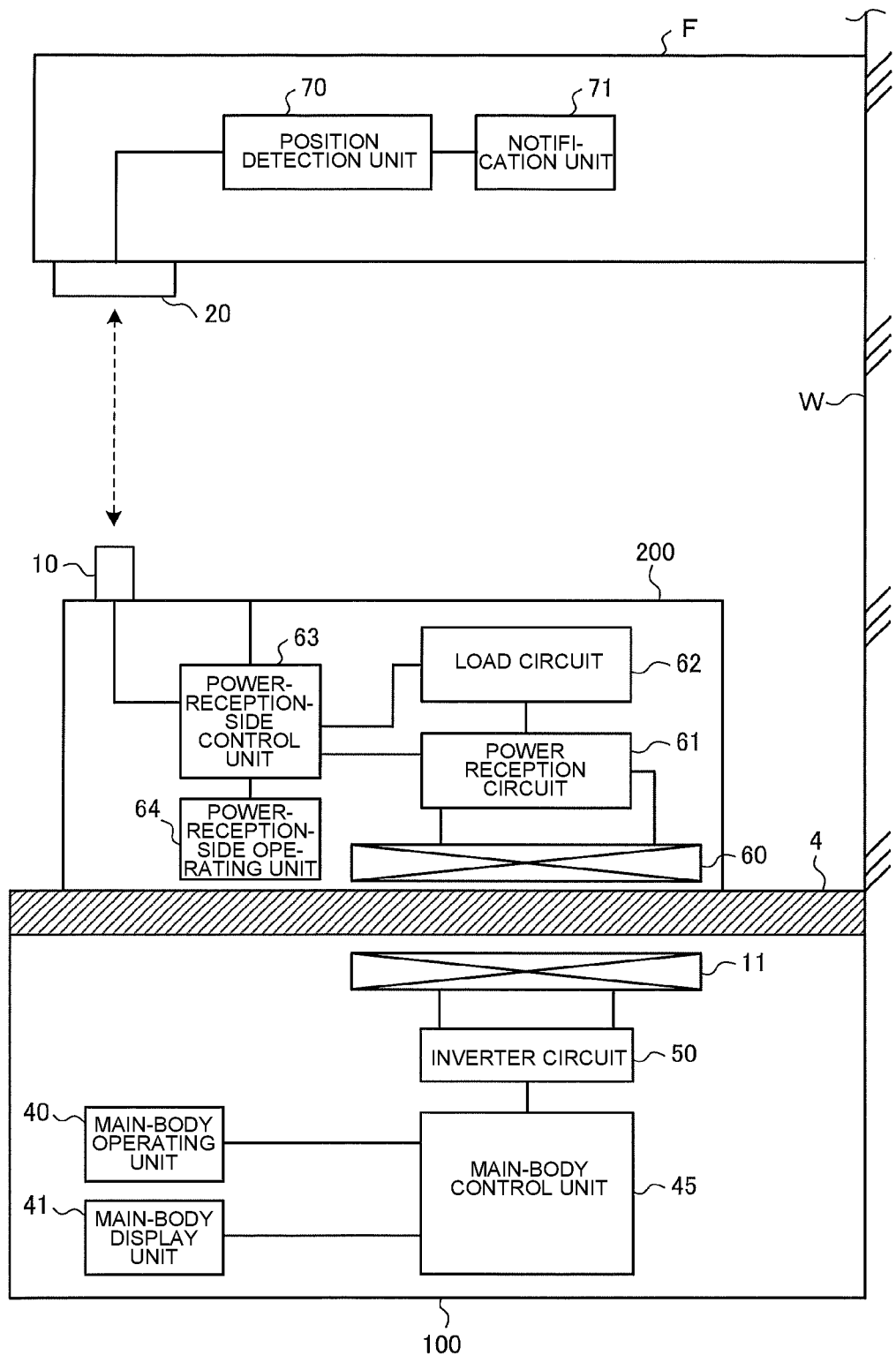
FIG. 8 is a block diagram illustrating Modification 2 of the wireless power transfer system according to Embodiment 1 of the present invention.

FIG. 8 is a block diagram illustrating Modification 2 of the wireless power transfer system according to Embodiment 1 of the present invention.

As illustrated in FIG. 8, the notification unit 71 is provided above the induction heating cooking apparatus 100. For example, the notification unit 71 is provided in the housing of the ventilating fan F. The notification unit 71 is connected to the position detection unit 70. The position detection unit 70 causes the notification unit 71 to indicate whether the power reception device 200 is placed at a proper position or not.

Because of the above configuration, the configuration of the power reception device 200 can be simplified.

It is no indispensable that the notification unit 71 is provided above the induction heating cooking apparatus 100, that is, the notification unit 71 may be provided at any position.

The notification unit 71 may be, for example, a screen or a speaker of a portable information terminal such as a smart phone. In this case, the position detection unit 70 causes a communication unit compatible with the Wi-Fi (registered trademark) or Bluetooth (registered trademark) communication system to transmit information obtained by the position detection unit 70.

Modification 3

It is described above as a configuration that the first communication device 10 is provided on the power reception device 200, and the second communication device 20 is provided above the induction heating cooking apparatus 100. This, however, is not limitative.

The second communication device 20 may be provided on the power reception device 200, and the first communication device 10 may be provided above the induction heating cooking apparatus 100.

Figure 9:
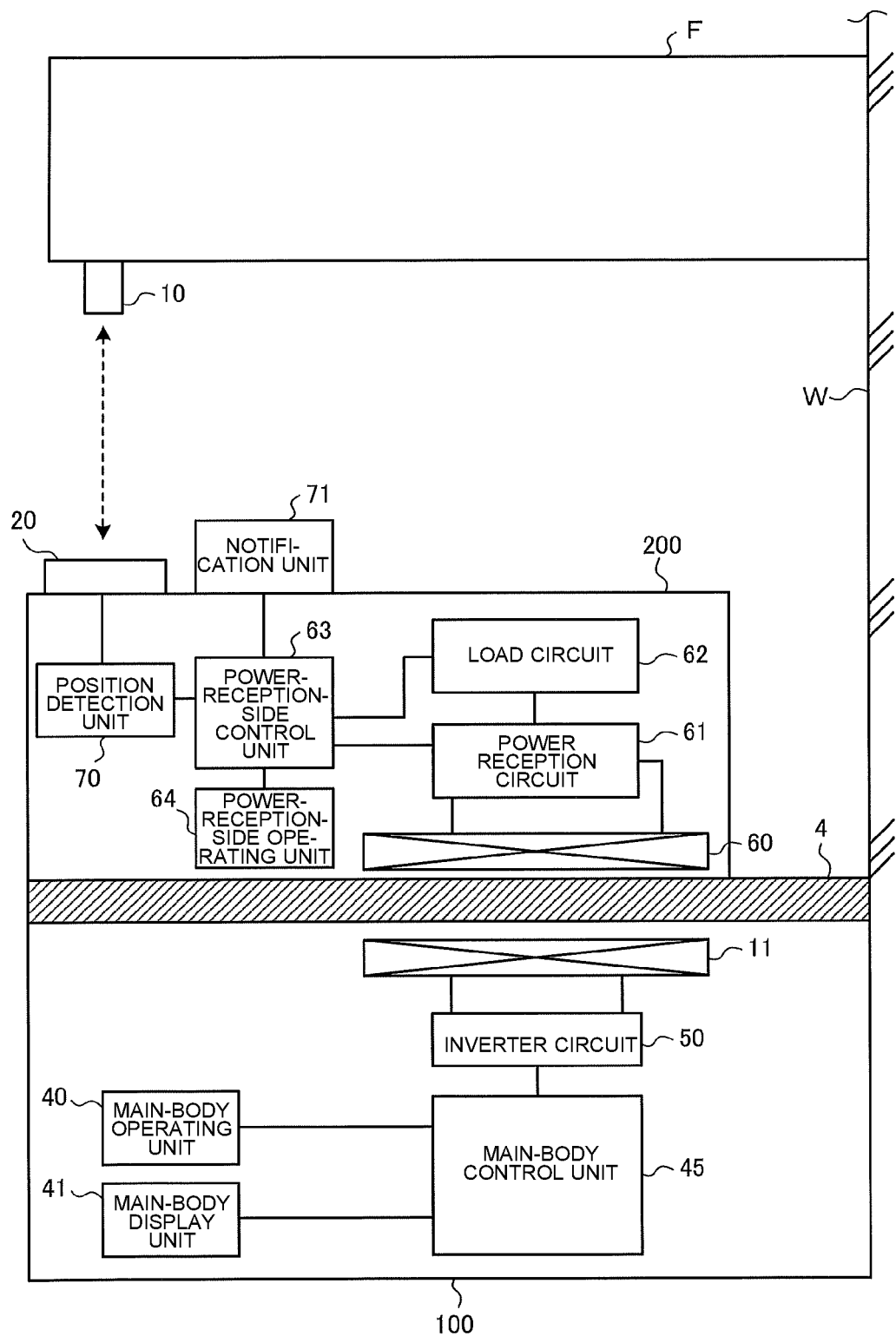
FIG. 9 is a block diagram illustrating Modification 3 of the wireless power transfer system according to Embodiment 1 of the present invention.

FIG. 9 is a block diagram illustrating Modification 3 of the wireless power transfer system according to Embodiment 1 of the present invention.

As illustrated in FIG. 9, the first communication device 10 is provided above the induction heating cooking apparatus 100. For example, the first communication device 10 is attached to the housing of the ventilating fan F.

The second communication device 20 is provided on the power reception device 200. The position detection unit 70 is provided in the power reception device 200.

Because of such a configuration, the first communication device 10 transmits a communication signal downwardly that is infrared radiation. The second communication device 20 receives the communication signal from the first communication device 10. The position detection unit 70 determines the position of the power reception device 200 through the above operation, and causes the notification unit 71 to indicate the result of the above determination.

Thereby, in the wireless power transfer system, the number of components disposed above the induction heating cooking apparatus 100 can be reduced, thus enabling the system to be set more easily.

Modification 4

It is described above as a configuration that the second communication device 20 includes the plural receiving units 21a to 21p. This, however, is not limitative. The second communication device 20 may include a single receiving unit only.

In the above configuration, in the case where the single receiving unit receives communication information from the first communication device 10, the position detection unit 70 determines that the power reception coil 60 is located within the predetermined region set in advance with respect to the heating coil. In the case where the single receiving unit does not receive communication information from the first communication device 10, the position detection unit 70 determines that the power reception coil 60 is not placed within the predetermined region set in advance with respect to the heating coil.

Because of such a configuration, the configuration of the second communication device 20 can be simplified.

Embodiment 2

A wireless power transfer system according to Embodiment 2 controls the inverter circuit 50 of the induction heating cooking apparatus 100 based on a communication signal transmitted from the first communication device 10 of the power reception device 200.

The configuration and operation of the wireless power transfer system according to Embodiment 2 will be described by referring mainly to differences between Embodiments 1 and 2. It should be noted that components which are the same as those in Embodiment 1 will be denoted by the same reference signs, and their descriptions will be omitted.

Configuration

Figure 10:
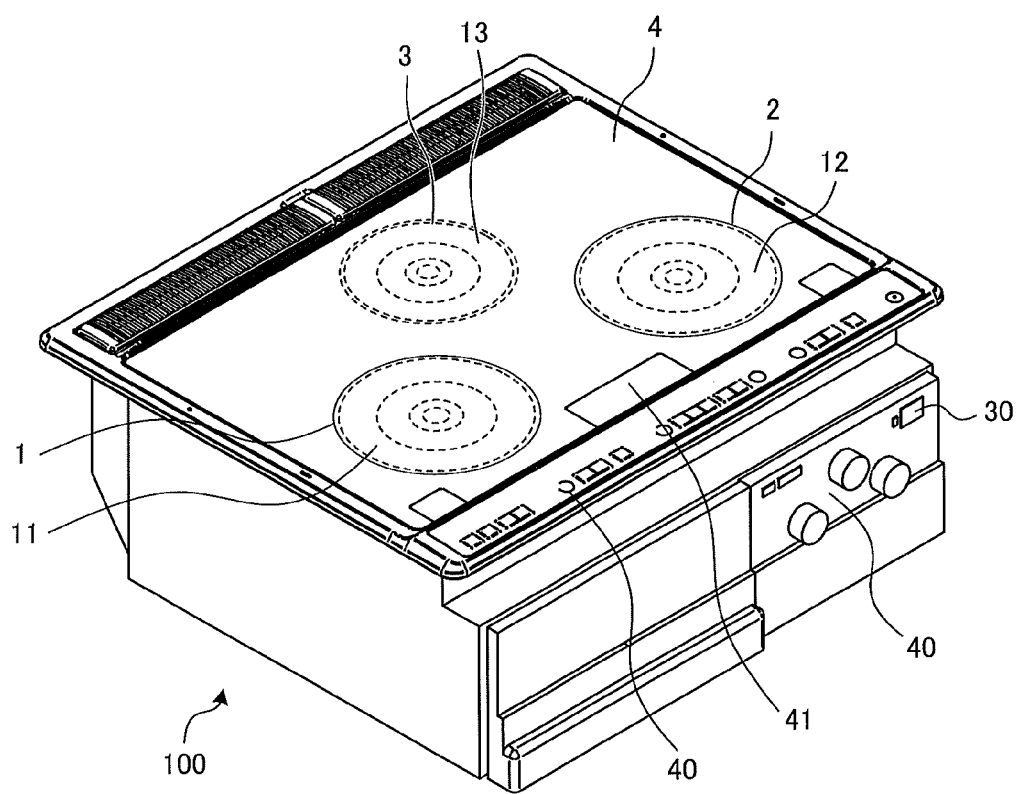
FIG. 10 is a perspective view illustrating the configuration of an induction heating cooking apparatus according to Embodiment 2 of the present invention.

FIG. 10 is a perspective view illustrating the configuration of an induction heating cooking apparatus according to Embodiment 2 of the present invention.

Figure 11:
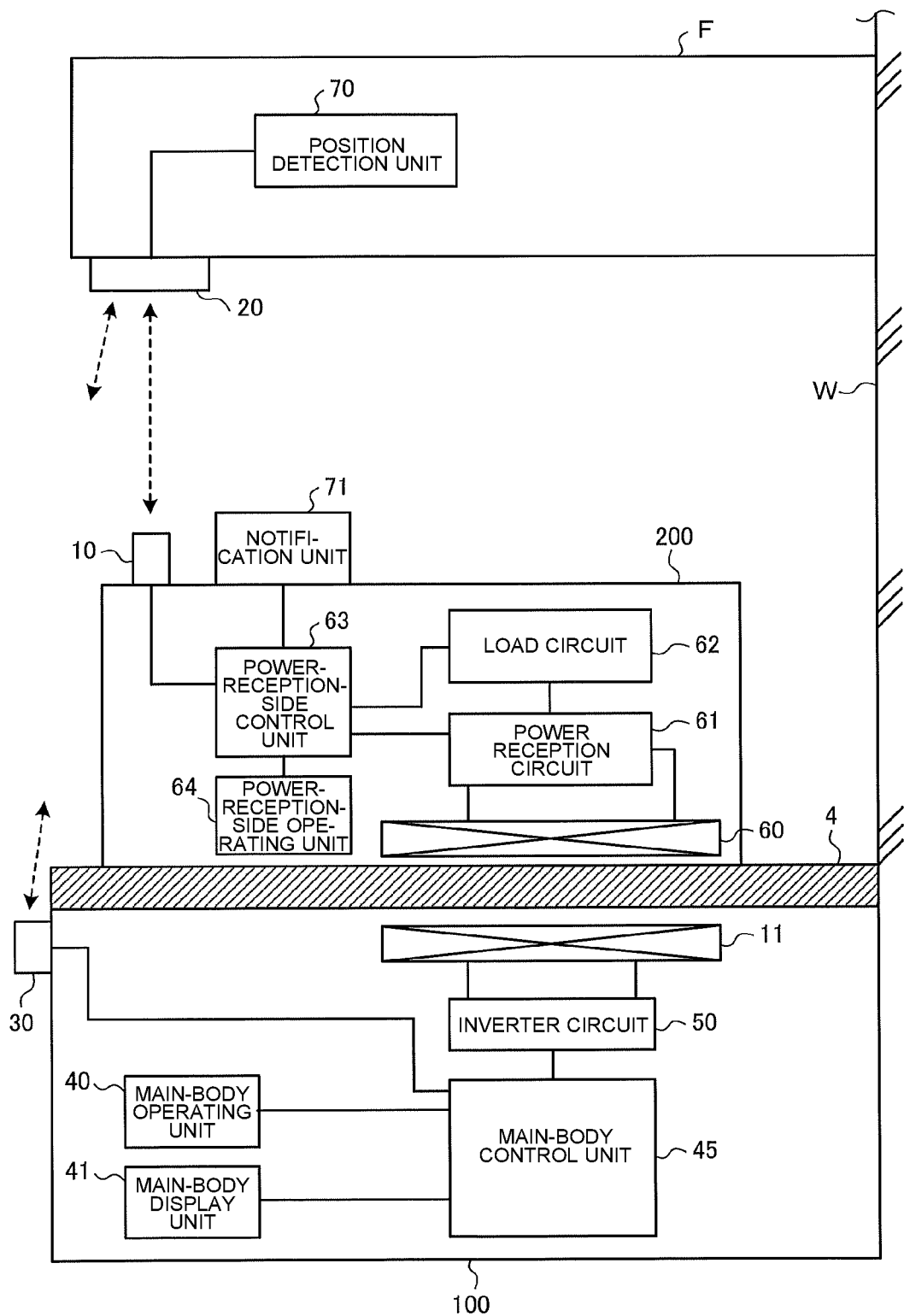
FIG. 11 is a block diagram illustrating the configuration of the wireless power transfer system according to Embodiment 2 of the present invention.

FIG. 11 is a block diagram illustrating the configuration of a wireless power transfer system according to Embodiment 2 of the present invention.

As illustrated in FIGS. 10 and 11, a third communication device 30 is provided on a front surface of the induction heating cooking apparatus 100. The third communication device 30 is a communication device that wirelessly communicates with the second communication device 20. The third communication device 30 includes, for example, an infrared light emitting element and an infrared light receiving element, and transmits and receives a communication signal to and from the second communication device 20 through infrared communication.

It is not indispensable that the third communication device 30 is provided on the front surface of the induction heating cooking apparatus 100. For example, the third communication device 30 may be provided on a front area of the top surface of the top plate 4. That is, the third communication device 30 may be provided at any position as long as the third communication device 30 is able to communicate with the second communication device 20.

To the main-body control unit 45, communication information that the third communication device 30 has received from the second communication device 20 is input. The main-body control unit 45 controls the inverter circuit 50 based on the communication information input from the third communication device 30. Furthermore, the main-body control unit 45 causes the third communication device 30 to transmit a communication signal including information regarding an input operation from the main-body operating unit 40.

In the case where infrared radiation is applied to wireless communication between the second communication device 20 and the third communication device 30, an object that reflects infrared radiation may be present between the second communication device 20 and the third communication device 30. This will be specifically described with reference to FIG. 12.

Figure 12:
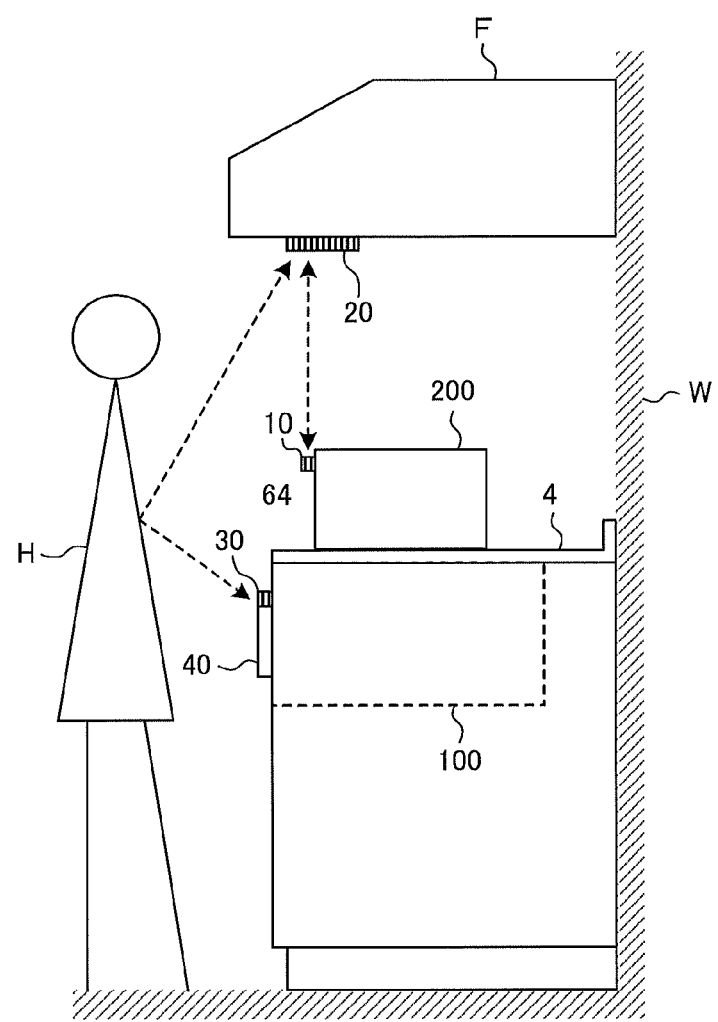
FIG. 12 is an explanatory view for use in describing infrared communication in the wireless power transfer system according to Embodiment 2 of the present invention.

FIG. 12 is an explanatory view for use in describing infrared communication in the wireless power transfer system according to Embodiment 2 of the present invention.

As illustrated in FIG. 12, a communication signal that is transmitted from the second communication device 20 and that is infrared radiation is reflected by a person H standing in front of the induction heating cooking apparatus 100, and the third communication device 30 thus receives the communication signal from the second communication device 20. Furthermore, a communication signal that is transmitted from the third communication device 30 and is infrared radiation is reflected by the person H standing in front of the induction heating cooking apparatus 100, and the second communication device 20 thus receives the communication signal from the third communication device 30.

For example, in the case where the third communication device 30 is provided on the top surface of the induction heating cooking apparatus 100, a cooking object, cookware, towel, or another object may be placed on the third communication device 30 and block a communication signal that is infrared radiation.

By contrast, in the case where the third communication device 30 is provided on the front surface of the induction heating cooking apparatus 100, and the second communication device 20 and the third communication device 30 communicate with each other using infrared radiation such that the infrared radiation is transmitted to and reflected from an object such as the person H, the second communication device 20 and the third communication device 30 can more reliably communicate with each other.

It should ben that that the third communication device 30 may be formed to include plural infrared light emitting elements and plural infrared light receiving elements. A light emitting surface of the infrared light emitting element and a light receiving surface of the infrared light receiving element may be provided to be inclined toward the front surface of the induction heating cooking apparatus 100.

Operation

An operation of the wireless power transfer system according to Embodiment 2 will be described.

Figure 13:
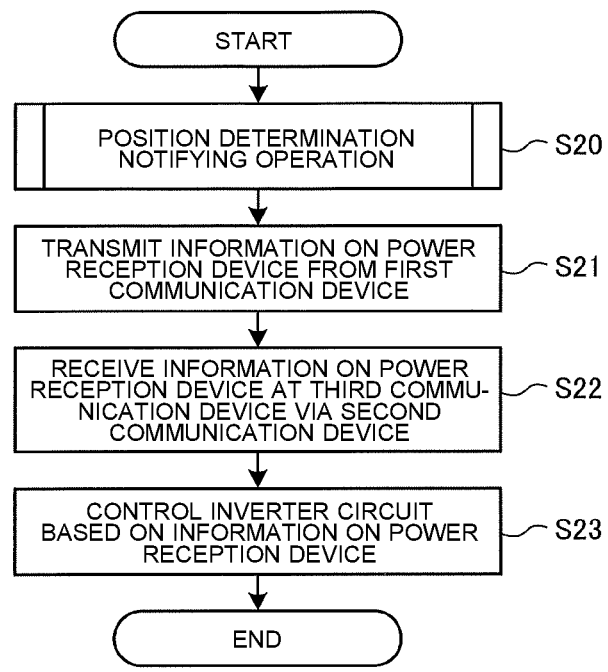
FIG. 13 is a flowchart indicating an operation of the wireless power transfer system according to Embodiment 2 of the present invention.

FIG. 13 is a flowchart illustrating the operation of the wireless power transfer system according to Embodiment 2 of the present invention. The operation will be described by referring to the steps as indicated in FIG. 13.

The user places the power reception device 200 on the top plate 4 of the induction heating cooking apparatus 100. The user performs, from the main-body operating unit 40 provided on the front surface of the induction heating cooking apparatus 100, an input operation to cause the power reception device 200 to start operating.

The main-body control unit 45 and the power-reception-side control unit 63 perform a position determination notifying operation (step S20). The position determination notifying operation is performed in steps which are the same as steps S10 to S16 described above with reference to Embodiment 1.

In the position determination notifying operation, when the notification unit 71 indicates information indicating that the power reception device 200 is placed at a proper position, and the position determination notifying operation ends, the user then performs, from the power-reception-side operating unit 64 provided on the power reception device 200, an input operation to set the operation of the power reception device 200. For example, to the power-reception-side operating unit 64, operation instructions to start and stop the supply of power to the power reception device 200 and a set value such as the amount of power to be supplied to the load circuit 62 can be inputted.

The power-reception-side control unit 63 causes the first communication device 10 to transmit a communication signal including information indicating an input operation from the power-reception-side operating unit 64 (step S21).

The second communication device 20 provided above the induction heating cooking apparatus 100 receives the communication signal from the first communication device 10. The second communication device 20 transmits, to the third communication device 30, the communication signal including information indicating the input operation performed from the power-reception-side operating unit 64. The third communication device 30 provided on the front surface of the induction heating cooking apparatus 100 receives the communication signal from the second communication device 20 (step S22).

The third communication device 30 inputs, to the main-body control unit 45, information indicating the input operation performed from the power-reception-side operating unit 64, which is included in the communication signal received from the second communication device 20. The main-body control unit 45 controls the inverter circuit 50 based on the information indicating the input operation performed from the power-reception-side operating unit 64 (step S23).

For example, in the case where the information regarding the input operation is indicative of an operation to cause the load circuit 62 of the power reception device 200 to operate at "high output", the main-body control unit 45 controls driving of the inverter circuit 50 such that power corresponding to "high output" is supplied to the heating coil.

As a result, the power reception coil 60 of the power reception device 200 receives power corresponding to "high output" from the heating coil. The power received by the power reception coil 60 is transferred to the load circuit 62 via the power reception circuit 61, thus causing the load circuit 62 to operate.

Furthermore, for example, in the case where the information regarding the input operation is indicative of an operation to "stop" the load circuit 62 of the power reception device 200, the main-body control unit 45 causes driving of the inverter circuit 50 to stop.

Thereby, transfer of power from the heating coil to the power reception coil 60 is stopped, and the operation of the load circuit 62 of the power reception device 200 thus stops.

It is described above that in step S21, the power-reception-side control unit 63 causes the first communication device 10 to transmit the communication signal including information indicating the input operation from the power-reception-side operating unit 64. This, however, is not limitative. The power-reception-side control unit 63 may cause the first communication device 10 to transmit a communication signal including an arbitrary information related to the operation of the power reception device 200.

For example, the power reception device 200 is provided with a current sensor that detects current that flows through the power reception coil 60. The power-reception-side control unit 63 may output, in the case where the current through the power reception coil 60 exceeds a set threshold, information indicating protection information for stopping the transfer of power from the heating coil to the power reception coil 60 or protection information for reducing the power to be transferred. The main-body control unit 45 performs a control to stop the inverter circuit 50 or reduce the power to be transferred, based on the protection information acquired via the third communication device 30. Therefore, for example, even if the user sets an excessive power value by mistake from the main-body operating unit 40 of the induction heating cooking apparatus 100, it is possible to prevent overcurrent from flowing through the power reception coil 60.

It should be noted that in step S20, in the case where information indicating that the power reception device 200 is placed at a proper position has not been received from the second communication device 20 via the third communication device 30, the main-body control unit 45 may restrict power that is supplied to the heating coil. For example, regardless of the operation from the main-body operating unit 40, the main-body control unit 45 may restrict power that is supplied from the inverter circuit 50 to the heating coil such that the power does not exceed power for the control power supply.

As described above, in Embodiment 2, the induction heating cooking apparatus 100 includes the third communication device 30 that communicates with the second communication device 20. The third communication device 30 receives, via the second communication device 20, a communication signal transmitted from the first communication device 10.

Thus, even if an object that blocks a communication signal is present between the first communication device 10 and the third communication device 30, the third communication device 30 is able to receive, via the second communication device 20, a communication signal transmitted from the first communication device 10. Therefore, it is possible to reduce occurrence of a communication failure between the first communication device 10 and the third communication device 30, and thus improve the reliability of the wireless power transfer system and the usability thereof for the user.

For example, in the case where the third communication device 30 is provided under the top plate 4, the top plate 4 is made of material that allows infrared radiation to transmit through the material, and the first communication device 10 and the third communication device 30 communicate with each other using infrared radiation, for example, dirt adhering to the top plate 4 or a flaw in the top plate 4 may sometimes block as blockage, infrared radiation that passes through the top plate 4. In Embodiment 2, the first communication device 10 and the third communication device 30 communicate with each other via the second communication device 20 placed above the induction heating cooking apparatus 100, and it is therefore possible to reduce occurrence of a communication failure.

In Embodiment 2, the main-body control unit 45 controls the inverter circuit 50 based on a communication signal transmitted from the first communication device 10, which the third communication device 30 has received from the second communication device 20.

Thus, it is possible to transfer power from the heating coil to the power reception coil 60 in accordance with the operating state of the power reception device 200.

It should be noted that the above description regarding Embodiment 2 refers to the case where the second communication device 20 and the third communication device 30 communicate with each other using infrared communication. This, however, is not limitative. The second communication device 20 and the third communication device 30 may include, for example, a wireless communication interface compatible with an arbitrarily selected communication standard such as Wi-Fi (registered trademark) or Bluetooth (registered trademark).

It is not indispensable that the communication between the second communication device 20 and the third communication device 30 is wirelessly performed. That is, the communication may be performed using a communication line.

Modification 1

It is described above as a configuration that the position detection unit 70 is provided above the induction heating cooking apparatus 100. This, however, is not limitative.

The position detection unit 70 may be provided in the induction heating cooking apparatus 100. Also, the main-body control unit 45 may has the function of the position detection unit 70.

Figure 14:
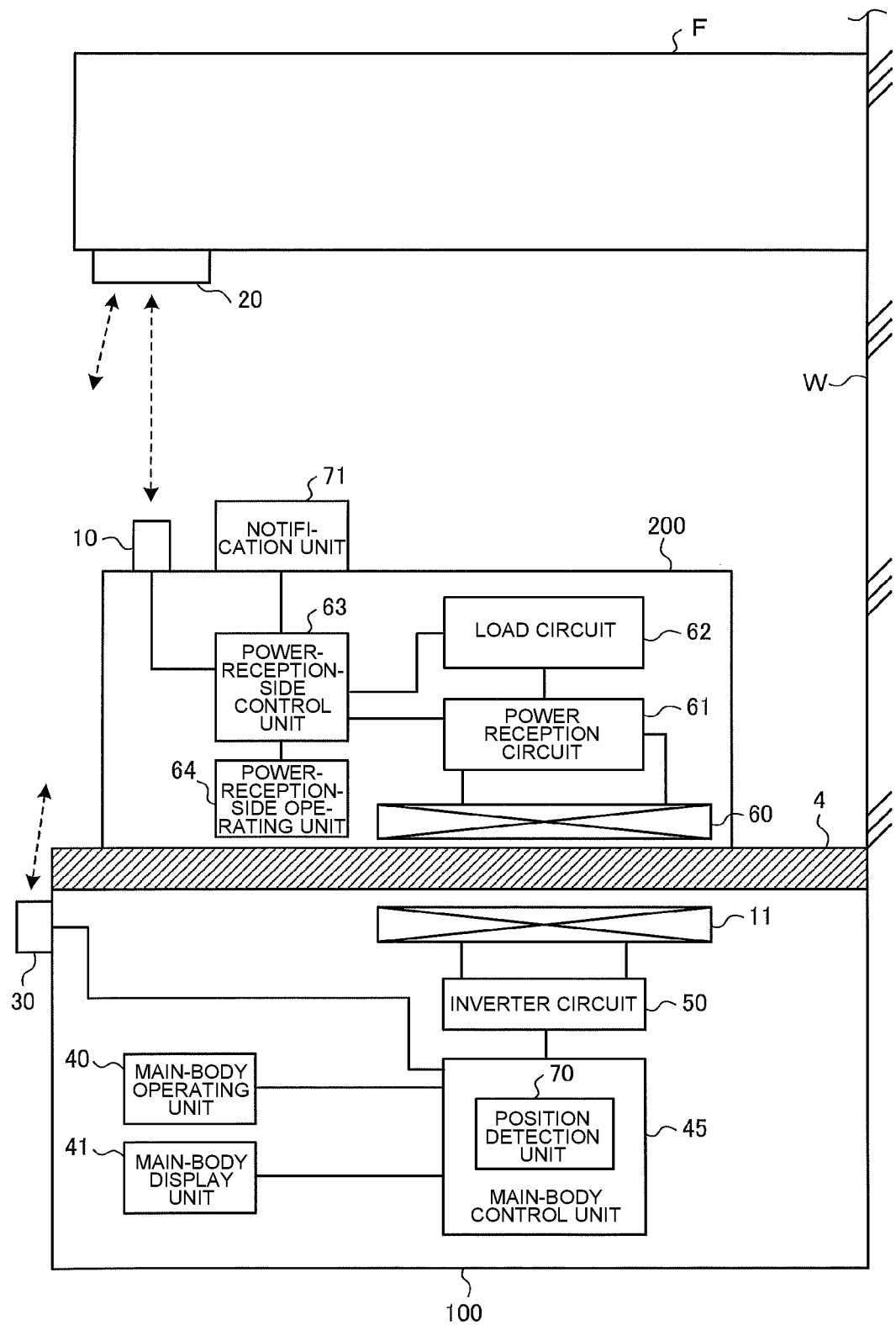
FIG. 14 is a block diagram illustrating Modification 1 of the wireless power transfer system according to Embodiment 2 of the present invention.

FIG. 14 is a block diagram illustrating Modification 1 of the wireless power transfer system according to Embodiment 2 of the present invention.

As illustrated in FIG. 14, the main-body control unit 45 includes the function of the position detection unit 70.

Because of such a configuration, the second communication device 20 transmits, to the third communication device 30, communication signals received by the plural receiving units 21a to 21p from the first communication device 10. The main-body control unit 45 acquires the communication signals from the second communication device 20 via the third communication device 30. Based on the communication signals received by the plural receiving units 21a to 21p, the main-body control unit 45 determines whether the power reception device 200 is placed at a proper position. The main-body control unit 45 causes the main-body display unit 41 to indicate whether the power reception device 200 is placed at a proper position.

Thereby, it is possible to reduce the number of components of the wireless power transfer system that are disposed above the induction heating cooking apparatus 100, thus facilitating installation of the system.

Modification 2

Figure 15:
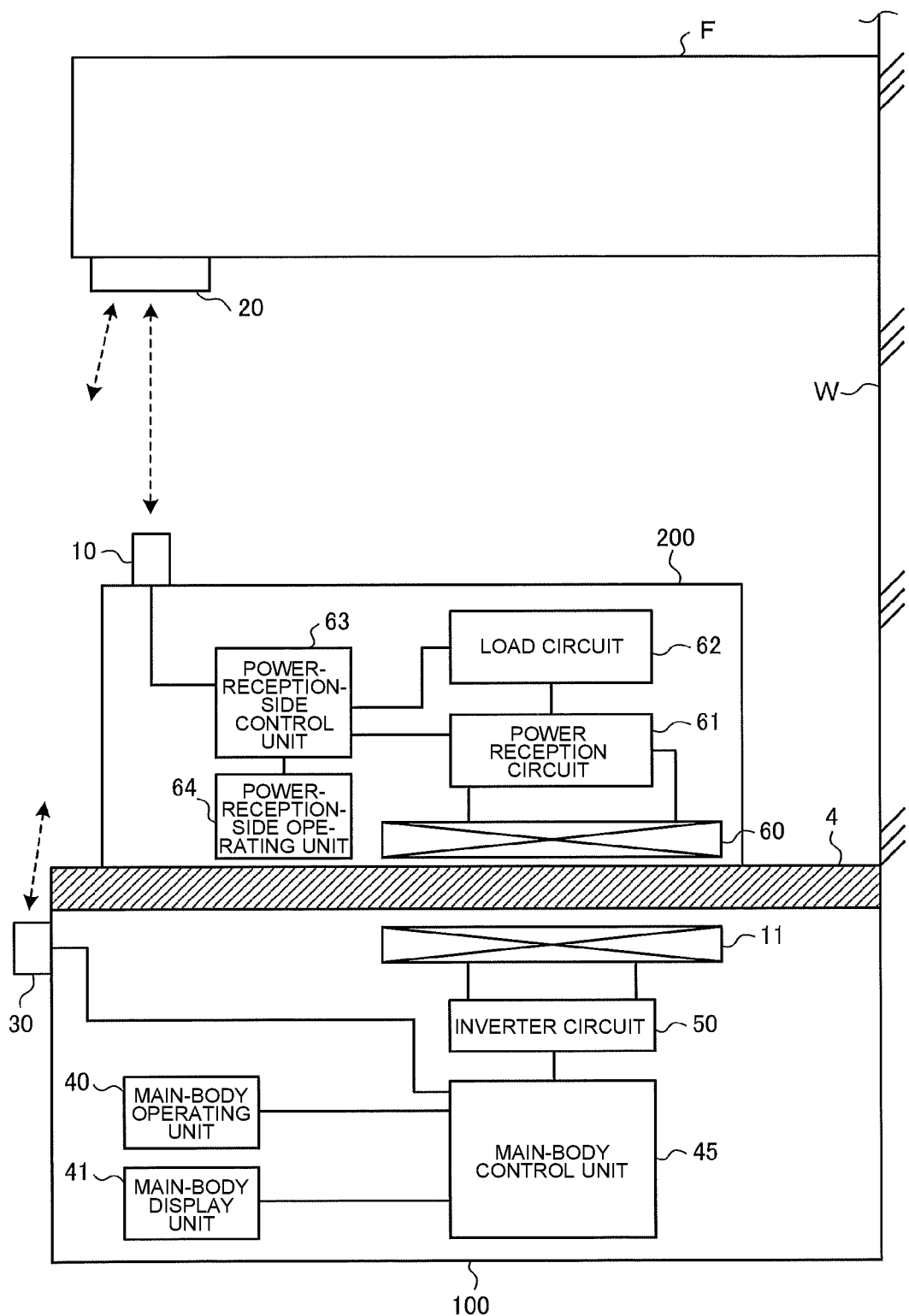
FIG. 15 is a block diagram illustrating Modification 2 of the wireless power transfer system according to Embodiment 2 of the present invention.

FIG. 15 is a block diagram illustrating Modification 2 of the wireless power transfer system according to Embodiment 2 of the present invention.

As illustrated in FIG. 15, of the components of the wireless power transfer system, the position detection unit 70 and the notification unit 71 may be omitted. The wireless power transfer system may be operated such that it does not perform the above position detection operation or the above position detection notifying operation.

That is, in the wireless power transfer system, the first communication device 10 provided on the power reception device 200, the second communication device 20 provided above the induction heating cooking apparatus 100, and the third communication device 30 provided on the induction heating cooking apparatus 100 communicate with each other.

In the above configuration as well, even if an object that blocks a communication signal is present between the first communication device 10 and the third communication device 30, the third communication device 30 is able to receive, via the second communication device 20, a communication signal transmitted from the first communication device 10. Therefore, it is possible to reduce occurrence of a communication failure between the first communication device 10 and the third communication device 30, and thus improve the reliability of the wireless power transfer system and the usability thereof for the user.

Embodiment 3

The configuration and operation of a wireless power transfer system according to Embodiment 3 will be described by referring mainly to the differences between Embodiment 3 and Embodiments 1 and 2. With respect to Embodiment 3, components that are the same as those of each of Embodiments 1 and 2 will be denoted by the same reference signs, and their descriptions will be omitted.

Configuration

Figure 16:
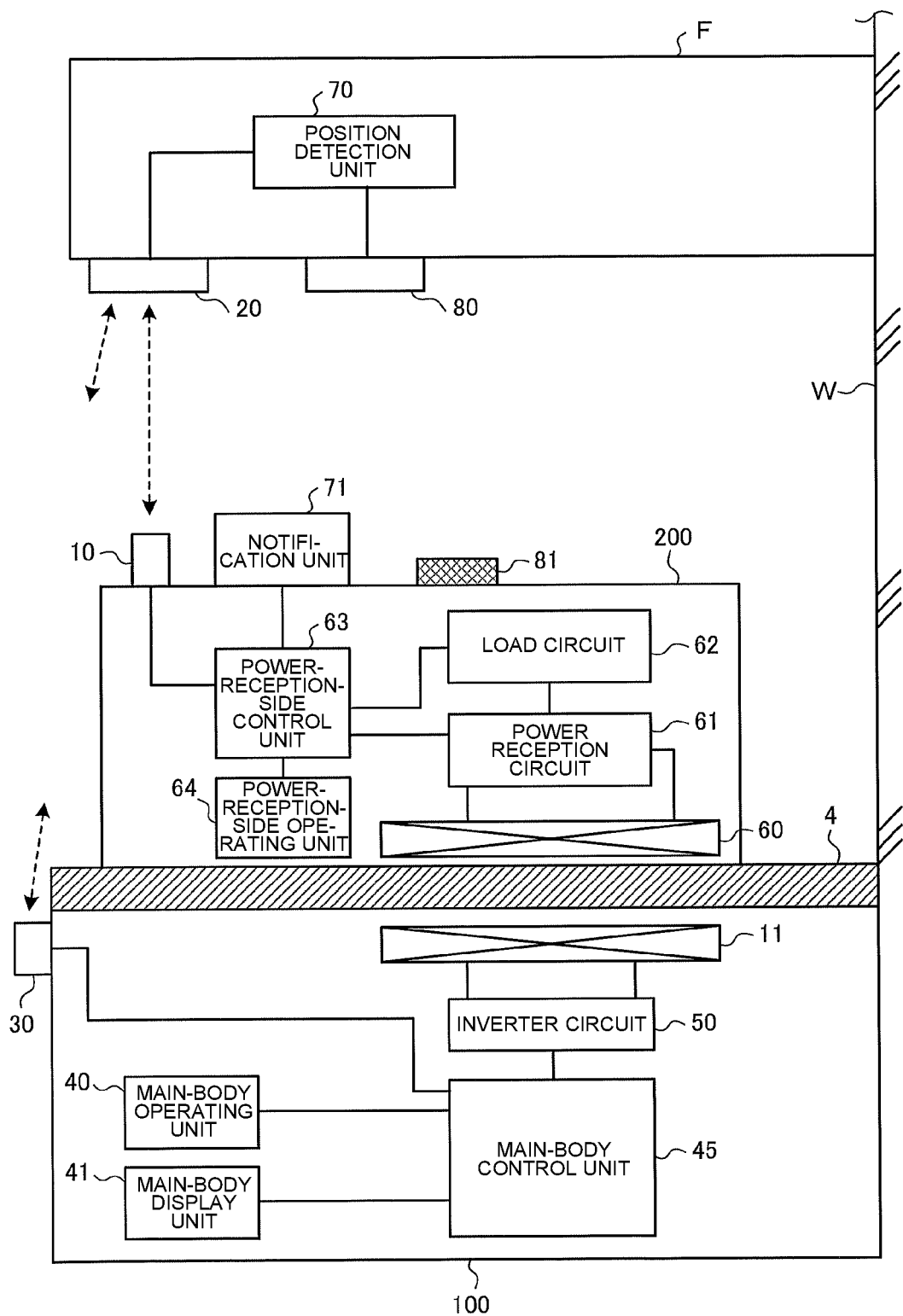
FIG. 16 is a block diagram illustrating the configuration of a wireless power transfer system according to Embodiment 3 of the present invention.

FIG. 16 is a block diagram illustrating the configuration of a wireless power transfer system according to Embodiment 3 of the present invention.

As illustrated in FIG. 16, the wireless power transfer system according to Embodiment 3 includes an imaging device 80 and a position indicating element 81, in addition to the components described above regarding Embodiment 1 or 2.

The imaging device 80 is provided above the induction heating cooking apparatus 100. For example, the imaging device 80 is attached to the housing of the ventilating fan F provided above the induction heating cooking apparatus 100.

The imaging device 80 captures an image of the power reception device 200 placed on the induction heating cooking apparatus 100, and outputs information on the captured image to the position detection unit 70. The imaging device 80 includes an imaging element such as a CCD, and outputs as image data, information on the color and brightness of each of pixels that are detected by the imaging element. The imaging device 80 is, for example, a digital camera or a video camera.

The position indicating element 81 is provided on the power reception device 200. For example, the first communication device 10 is provided on the top surface of the housing of the power reception device 200. The position indicating element 81 is a mark having a predetermined color or shape.

For example, as the position indicating element 81, a mark having a predetermined color is provided on the top surface of the power reception device 200 by paint coating, printing, or other methods. Alternatively, for example, as the position indicating element 81, a mark having a predetermined shape is formed on the top face of the power reception device 200 by forming irregularities at the top surface face of the housing of the power reception device 200 or attaching another component to the top face of the housing of the power reception device 200.

It should be noted that preferably, the predetermined color should be different from the color of the top surface of the housing of the power reception device 200, and the predetermined shape should be a shape that can be easily recognized during an image recognition process, which will be described later. As examples of such a shape, a circle, a triangle, and a quadrangle are present. In other words, the position indicating element 81 may be any component that can serve as a mark indicating the position of the power reception device 200. The position indicating element 81 may be part of the power reception device 200. For example, a circular power switch provided at the power reception device 200 may be used as the position indicating element 81.

Position Detection Operation

A position detection operation of the position detection unit 70 will be described.

Figure 17:
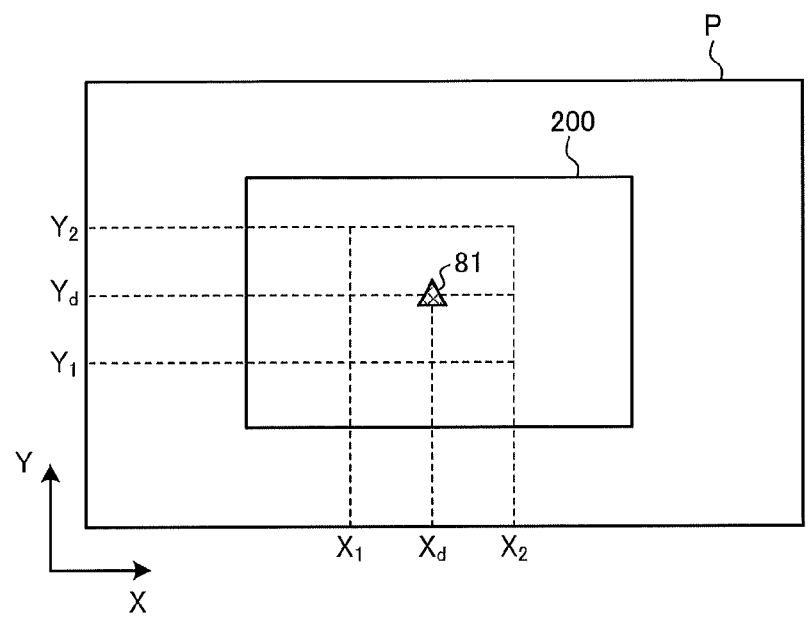
FIG. 17 is an explanatory view for use in describing a position detection operation of the wireless power transfer system according to Embodiment 3 of the present invention.

FIG. 17 is an explanatory view for use in describing a position detection operation of the wireless power transfer system according to Embodiment 3 of the present invention. FIG. 17 schematically illustrates an image P of the power reception device 200 placed on the induction heating cooking apparatus 100, which has been captured by the imaging device 80.

The position detection unit 70 detects the position of the position indicating element 81 included in the image P captured by the imaging device 80. For example, as illustrated in FIG. 17, the position detection unit 70 determines the position of each pixel as XY-coordinates, where the horizontal and vertical axes of the image P are X- and Y-axes, respectively. Then, through an arbitrary image recognition process, the position detection unit 70 extracts the position of the position indicating element 81 in the image P, and detects the position as position Xd, Yd in the XY-coordinate system.

For example, the position detection unit 70 extracts a characteristic point where a change in color or brightness occurs in each pixel of the image P. The position detection unit 70 connects plural characteristic points to extract a color or shape contour. The position detection unit 70 then detects the position of the position indicating element 81 based on whether the contour extracted from the image P coincides with or approximates to a color or shape contour of the position indicating element 81 that is stored as data in advance.

The way of detecting the position of the position indicating element 81 is not limited to the above detection way. An arbitrary image recognition process can be applied to the way of detecting the position of the position indicating element 81.

The position detection unit 70 determines whether the power reception coil 60 is located within a region set in advance with respect to the heating coil or not, based on the position of the position indicating element 81 in the image P captured by the imaging device 80.

The region set in advance in this case is a positional range in which the power reception coil 60 is located such that the amount of reduction of the power reception efficiency in power transfer falls within the allowable range.

For example, referring to FIG. 17, as the region set in advance, a range from X1 to X2 along the X-axis of the image P and a range from Y1 to Y2 along the Y-axis of the image P are set.

In this regard, a range of coordinates that corresponds to the region set in advance is set in advance at the position detection unit 70 by moving the power reception device 200 such that the amount of reduction of the power reception efficiency in power transfer falls within the allowable range, and acquiring the coordinates of the position indicating element 81 in the image P captured at that time.

Although FIG. 17 illustrates a region set in advance having a rectangular shape, this is not limitative. The region set in advance may be a circular region whose center coincides with the position of the position indicating element 81 when the power reception device 200 is placed at a position where the power reception coil 60 is located just above the heating coil.

The position detection unit 70 determines that the power reception device 200 is placed at a proper position in the case where the position Xd, Yd of the position indicating element 81 in the XY coordinates of the image P falls within the range from X1 to X2 and the range from Y1 to Y2. By contrast, the position detection unit 70 determines that the power reception device 200 is not placed at a proper position in the case where the position Xd, Yd of the position indicating element 81 in the XY coordinates of the image P does not fall within the range from X1 to X2 and the range from Y1 to Y2.

As in Embodiment 1 or 2 as described above, the position detection unit 70 causes the second communication device 20 to transmit information on the result of determination. Then, as in Embodiment 1 or 2, the notification unit 71 indicates the result of determination by the position detection unit 70.

The subsequent operation is performed in a manner similar to that of Embodiment 1 or 2 mentioned above.

As described above, in Embodiment 3, the position detection unit 70 determines whether the power reception coil 60 is located within the predetermined region set in advance with respect to the heating coil, based on the position of the position indicating element 81 in an image captured by the imaging device 80.

It is therefore possible to indicate that the power reception device 200 is placed at a proper position where power is received such that the amount of reduction of the power reception efficiency in power transfer falls within the allowable range, and thus to prevent great reduction of the power reception efficiency in transferring power from the induction heating cooking apparatus 100 to the power reception device 200. Therefore, it is possible to ensure a sufficient performance of the power reception device 200, and improve the usability thereof.

Furthermore, in the image P captured by the imaging device 80 provided above the induction heating cooking apparatus 100, the position indicating element 81 on the power reception device 200 is detected, whereby it is possible to accurately detect the position of the power reception device 200 placed on the top plate 4.

The position detection unit 70 may perform both the position detection operation according to Embodiment 1 and the position detection operation according to Embodiment 3 to determine whether the power reception device 200 is placed at a proper position. In other words, the position detection unit 70 may perform a position detection operation based on a communication signal received by the second communication device 20 from the first communication device 10, and a position detection operation based on the position of the position indicating element 81 in the image P captured by the imaging device 80.

In this regard, a position detection operation using the imaging device 80 is easily affected by, for example, smoke produced from an object being heated during cooking. Therefore, the above position detection operation according to Embodiment 1 is also performed, to thereby improve the reliability of the position detection operation.

It is described above as a configuration that the position indicating element 81 is provided on the upper surface of the housing of the position indicating element 81. This, however, is not limitative. The position indicating element 81 may be provided in such a manner as to project from a side of the housing of the power reception device 200.

The entire outer shape of the power reception device 200 may be the outer shape of the position indicating element 81. For example, the entire color or shape of the top surface of the housing of the power reception device 200 may be that of the position indicating element 81. In this case, the outer shape of the power reception device 200 in the image P is extracted, and the center position of the outer shape is detected as the position of the position indicating element 81.

The shape of the position indicating element 81 is not limited to a planar shape. The position indicating element 81 may be cuboid. For example, the imaging device 80 may be a stereo camera to acquire three-dimensional image data.

Modification 1

Figure 18:
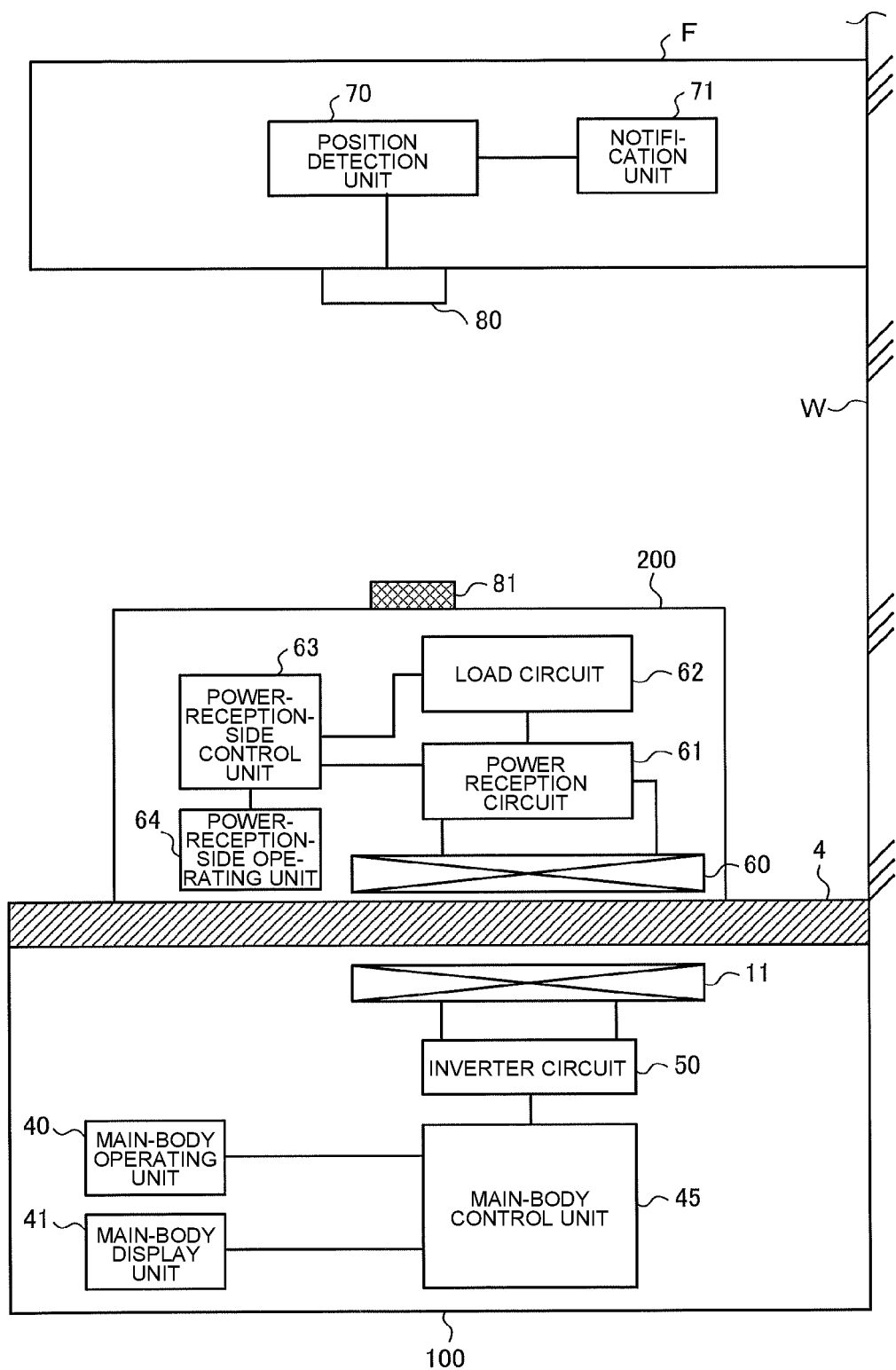
FIG. 18 is a block diagram illustrating Modification 1 of the wireless power transfer system according to Embodiment 3 of the present invention.

FIG. 18 is a block diagram illustrating Modification 1 of the wireless power transfer system according to Embodiment 3 of the present invention.

As illustrated in FIG. 18, of the components of the wireless power transfer system, the first communication device 10, the second communication device 20, and the third communication device 30 may be omitted. In this configuration, the notification unit 71 is provided above the induction heating cooking apparatus 100, and connected to the position detection unit 70. The position detection unit 70 causes the notification unit 71 to indicate whether the power reception device 200 is placed at a proper position.

In the above configuration as well, it is possible to indicate that the power reception device 200 is placed at a proper position where the power reception device 200 receives power such that the amount of reduction of the power reception efficiency in power transfer falls within the allowable range.

Furthermore, by omitting the first communication device 10, the second communication device 20, and the third communication device 30, it is possible to simplify the configuration of the wireless power transfer system.

Embodiment 4

The configuration and operation of a wireless power transfer system according to Embodiment 4 will be described by referring mainly to the differences between Embodiment 4 and Embodiments 1 to 3. Regarding Embodiment 4, components which are the same as those in each of Embodiments 1 to 3 will be denoted by the same reference signs, and their descriptions will thus be omitted.

Configuration

Figure 19:
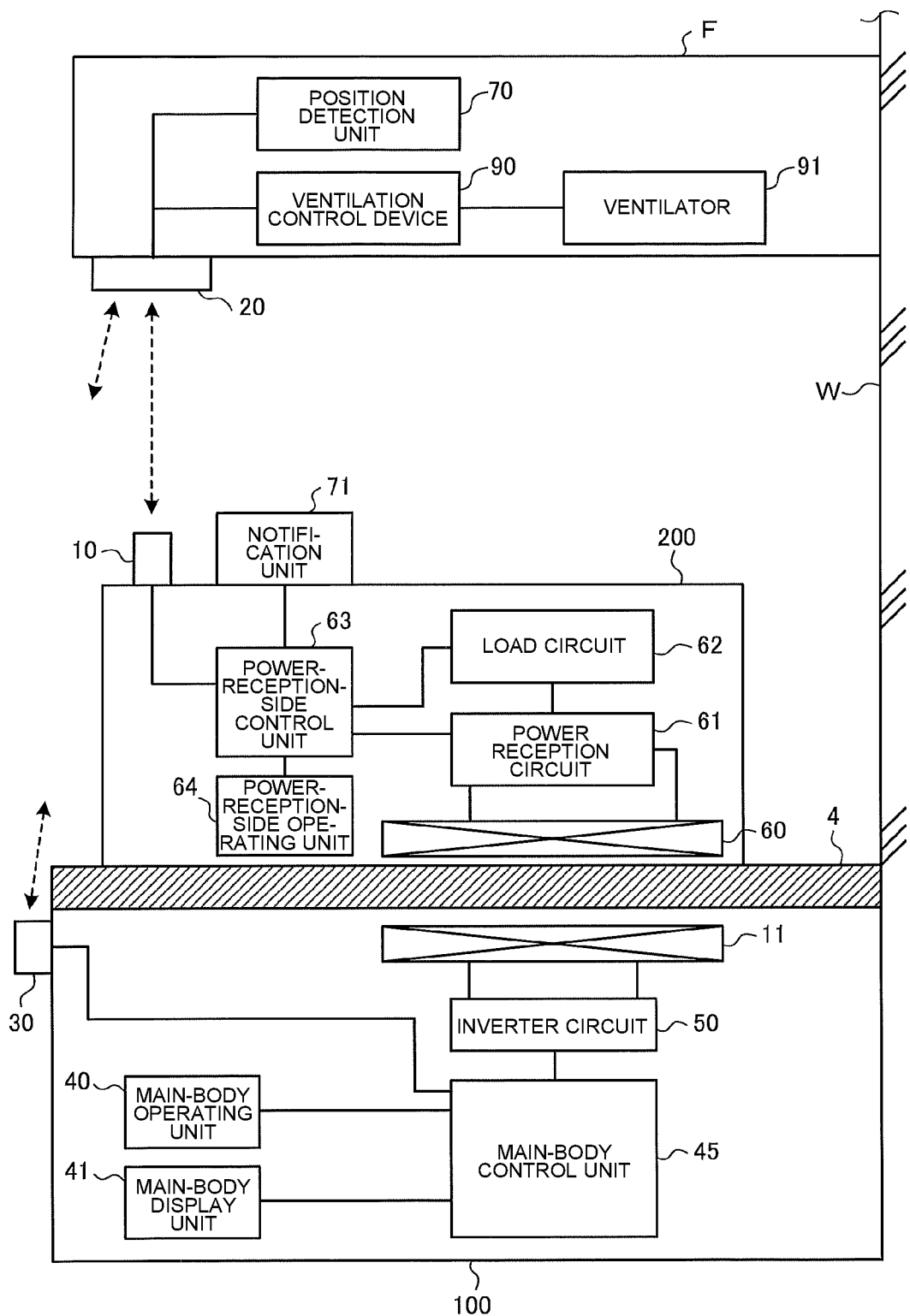
FIG. 19 is a block diagram illustrating the configuration of a wireless power transfer system according to Embodiment 4 of the present invention.

FIG. 19 is a block diagram illustrating the configuration of a wireless power transfer system according to Embodiment 4 of the present invention.

As illustrated in FIG. 19, the wireless power transfer system according to Embodiment 4 includes a ventilation control device 90, in addition to the components according to Embodiment 1 or 2. For example, the ventilation control device 90 is provided at the housing of the ventilating fan F located above the induction heating cooking apparatus 100.

A ventilator 91 is provided in the housing of the ventilating fan F to suck in air in an indoor space and exhaust the air to an outdoor space. The ventilator 91 includes, for example, a motor to drive a fan. The amount of air from the ventilator 91 is varied by varying the rotation speed of the motor.

The ventilation control device 90 controls an operation of the ventilator 91 in accordance with a communication signal received by the second communication device 20 from the first communication device 10. The ventilation control device 90 controls, for example, starting and stopping of the operation of the ventilator 91. The ventilation control device 90 also controls, for example, the rotation speed of the motor included in the ventilator 91 to thereby control an airflow level of the ventilator 91. For example, the ventilation control device 90 controls the air from the ventilator 91 in three stages: weak, medium, and strong. The ventilation control device 90 includes a microcomputer, a digital signal processor (DSP), or other components.

Operation

An operation of the wireless power transfer system according to Embodiment 4 will be described.

Figure 20:
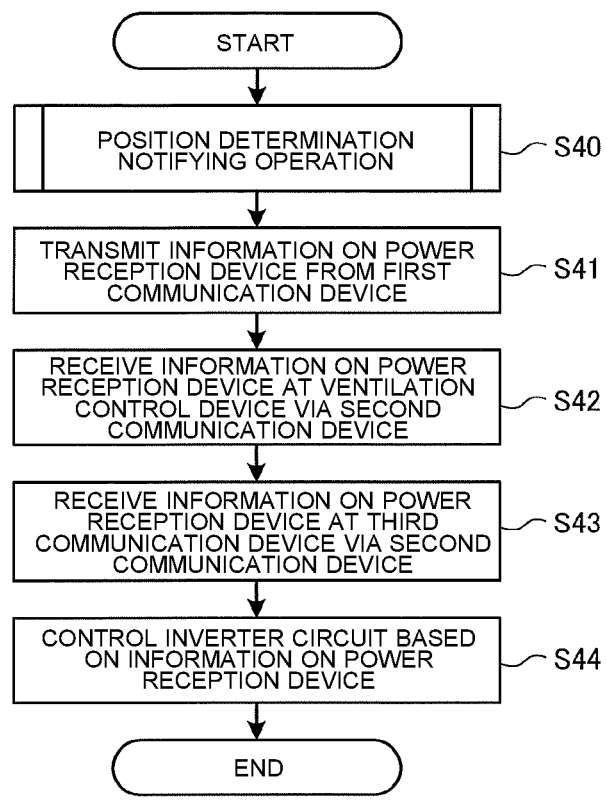
FIG. 20 is a flowchart indicating an operation of the wireless power transfer system according to Embodiment 4 of the present invention.

FIG. 20 is a flowchart indicating the operation of the wireless power transfer system according to Embodiment 4 of the present invention. The operation will be described by referring to steps as indicated in FIG. 20.

The user places the power reception device 200 on the top plate 4 of the induction heating cooking apparatus 100. The user performs, from the main-body operating unit 40 provided on the front surface of the induction heating cooking apparatus 100, an input operation to cause the power reception device 200 to start operating.

The main-body control unit 45 and the power-reception-side control unit 63 perform a position determination notifying operation (step S40). The position determination notifying operation is performed in the same steps as steps S10 to S16 described above with reference to Embodiment 1.

In the position determination notifying operation, when the notification unit 71 indicates that the power reception device 200 is placed at a proper position, and the position determination notifying operation ends, the user then performs, from the power-reception-side operating unit 64 provided on the power reception device 200, an input operation to set the operation of the power reception device 200. For example, to the power-reception-side operating unit 64, an operation instruction to start or stop the supply of power to the power reception device 200 and a set value for power to be supplied to the load circuit 62 are input.

The power-reception-side control unit 63 causes the first communication device 10 to transmit a communication signal including information indicating an input operation from the power-reception-side operating unit 64 (step S41).

The second communication device 20 provided above the induction heating cooking apparatus 100 receives the communication signal from the first communication device 10. The second communication device 20 inputs, to the ventilation control device 90, the information indicating the input operation from the power-reception-side operating unit 64, which is included in the communication signal received by the second communication device 20 from the first communication device 10 (step S42).

The ventilation control device 90 controls the ventilator 91 based on the information indicating the input operation from the power-reception-side operating unit 64.

For example, in the case where the information indicating the input operation is indicative of an operation to cause the load circuit 62 of the power reception device 200 to operate at "low output", the ventilation control device 90 controls the airflow level of the ventilator 91 to "weak".

For example, in the case where the information indicating the input operation is indicative of an operation to cause the load circuit 62 of the power reception device 200 to operate at "high output", the ventilation control device 90 controls the airflow level of the ventilator 91 to "strong".

For example, in the case where the information indicating the input operation is indicative of an operation to cause the load circuit 62 of the power reception device 200 to "stop", the ventilation control device 90 stops the operation of the ventilator 91.

When receiving a communication signal from the first communication device 10, the second communication device 20 transmits, to the third communication device 30, the communication signal including the information indicating the input operation from the power-reception-side operating unit 64. The third communication device 30 provided on the front surface of the induction heating cooking apparatus 100 receives the communication signal from the second communication device 20 (step S43). The operation in step S43 is the same as that in step S22 described above with reference to Embodiment 1.

The third communication device 30 inputs, to the main-body control unit 45, information indicating the input operation from the power-reception-side operating unit 64, which is included in the communication signal received from the second communication device 20. The main-body control unit 45 controls the inverter circuit 50 based on the information indicating the input operation from the power-reception-side operating unit 64 (step S44). The operation in step S44 is the same as that in step S23 described above with reference to Embodiment 1.

As described above, in Embodiment 4, the ventilation control device 90 controls the operation of the ventilator 91 provided above the induction heating cooking apparatus 100 in response to the communication signal received by the second communication device 20 from the first communication device 10.

Thus, the ventilator 91 can be operated in accordance with the operating state of the power reception device 200. It is therefore possible to reduce energy consumption and reduce operating sound made from the ventilator 91. Furthermore, the ventilator 91 can be operated at an airflow level suited for the operation of the power reception device 200, thus improving a ventilation efficiency. In addition, the user does not need to perform an operation to set the airflow level of the ventilator 91, and as a result the usability thereof for the user is improved.

For example, in the case where the input operation from the power-reception-side operating unit 64 of the power reception device 200 is indicative of an operation to cause the ventilator 91 to operate at "low output", the airflow level of the ventilator 91 is set to "weak", whereby it is possible to reduce energy consumption and reduce operating sound made from the ventilator 91.

For example, in the case where the input operation from the power-reception-side operating unit 64 of the power reception device 200 is indicative of an operation to cause the ventilator 91 to operate at "high output", the airflow level of the ventilator 91 is set to "strong", whereby it is possible to increase the ventilation efficiency.

In Embodiment 4, based on the information indicating the input operation from the power-reception-side operating unit 64, the ventilation control device 90 controls the operation of the ventilator 91, and the main-body control unit 45 controls the inverter circuit 50.

It is therefore possible to achieve an operation of the ventilator 91 and a heating operation of the induction heating cooking apparatus 100 that are suited for the operating state of the power reception device 200.

In Embodiment 4, to the ventilation control device 90, communication information received by the second communication device 20 is input. Thus, a communication device that performs the above position detection operation and a communication device that controls the ventilator 91 do not need to be provided separately. Therefore, an inexpensive system can be achieved.

Furthermore, the ventilator 91 is operated in interlock with the operation of the power reception device 200. As a result, a communication unit that is employed in an existing induction heating cooking system in which an induction heating cooking apparatus 100 and a ventilator 91 perform interlock with each other can be also employed in the wireless power transfer system according to Embodiment 4. An inexpensive system can thus be achieved.

Modification 1

It is described above as an operation that the ventilation control device 90 controls the operation of the ventilator 91 based on the information indicating the input operation from the power-reception-side operating unit 64. This, however, is not limitative.

The ventilation control device 90 may control the operation of the ventilator 91 based on information indicating the input operation from the main-body operating unit 40.

Specifically, the main-body control unit 45 causes the third communication device 30 to transmit, to the second communication device 20, a communication signal including the information indicating the input operation from the main-body operating unit 40. The second communication device 20 inputs, to the ventilation control device 90, the information indicating the input operation from the main-body operating unit 40, which is included in the communication signal received by the second communication device 20 from the third communication device 30. The ventilation control device 90 controls the ventilator 91 based on the information indicating the input operation from the main-body operating unit 40.

For example, in the case where the information indicating the input operation is indicative of an operation to cause the inverter circuit 50 to operate at "low output", the ventilation control device 90 controls the airflow level of the ventilator 91 to "weak".

For example, in the case where the information indicating the input operation is indicative of an operation to cause the inverter circuit 50 to operate at "high output", the ventilation control device 90 controls the airflow level of the ventilator 91 to "strong".

For example, in the case where the information indicating the input operation is indicative of an operation to cause the inverter circuit 50 to "stop", the ventilation control device 90 stops the operation of the ventilator 91.

Because of the above configuration, in the wireless power transfer system, in the case where an object to be heated that is placed on the top plate 4 of the induction heating cooking apparatus 100 is inductively heated using a heating coil, it is possible to achieve an operation of the ventilator 91 that is suited for the operating state of the induction heating cooking apparatus 100.

Embodiment 5

With respect to a wireless power transfer system according to Embodiment 5, it will be described how it is determined whether the position of the power reception device 200 is proper or not, based on a mutual inductance between the heating coil and the power reception coil 60.

The configuration and operation of the wireless power transfer system according to Embodiment 5 will be described by referring mainly to the differences between Embodiment 5 and Embodiments 1 to 4. Regarding Embodiment 5, components that are the same as those of each of Embodiments 1 to 4 will be denoted by the same reference signs, and their descriptions will thus be omitted.

Configuration

Figure 21:
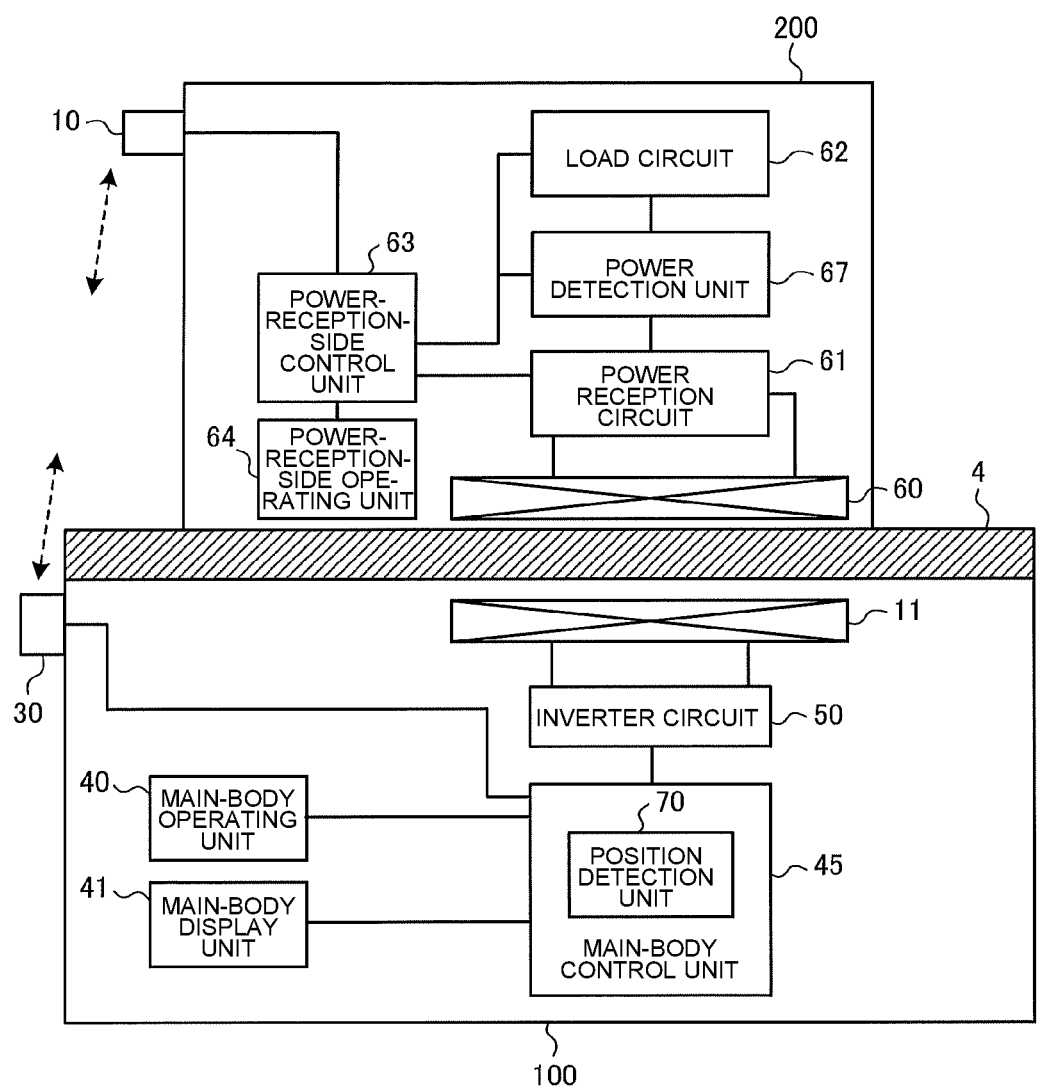
FIG. 21 is a block diagram illustrating the configuration of a wireless power transfer system according to Embodiment 5 of the present invention.

FIG. 21 is a block diagram illustrating the configuration of a wireless power transfer system according to Embodiment 5 of the present invention.

As illustrated in FIG. 21, the wireless power transfer system includes the induction heating cooking apparatus 100, the power reception device 200, the first communication device 10, and the position detection unit 70.

In Embodiment 5, the first communication device 10 communicates with the third communication device 30 provided on the induction heating cooking apparatus 100. The first communication device 10 is a communication device that wirelessly communicates with the third communication device 30. The first communication device 10 transmits and receives a communication signal to and from the third communication device 30 through, for example, infrared communication. The first communication device 10 transmits a communication signal downwardly that is infrared radiation.

The main-body control unit 45 has the function of the position detection unit 70.

The power reception device 200 includes a power detection unit 67. The power detection unit 67 measures the value of power received by the power reception coil 60. The power detection unit 67 measures the value of power from, for example, a voltage of the power reception coil 60 and current through the power reception coil 60.

The main-body display unit 41 of the induction heating cooking apparatus 100 corresponds to "notification unit".

The wireless power transfer system according to Embodiment 5 does not include the second communication device 20 according to each of Embodiments 1 to 4.

Position Detection Operation

A position detection operation of the position detection unit 70 will be described.

The user performs, from the main-body operating unit 40 provided on the front surface of the induction heating cooking apparatus 100, an input operation to cause the power reception device 200 to start operating. The main-body control unit 45 drives the inverter circuit 50 to supply predetermined power to the heating coil. The power reception coil 60 of the power reception device 200 receives power from the heating coil. The power received by the power reception coil 60 is supplied to the power-reception-side control unit 63 via the power reception circuit 61. Thereby, the power-reception-side control unit 63 is made in a standby state in which the power-reception-side control unit 63 is ready to operate. The power detection unit 67 measures the value of power received by the power reception coil 60, and inputs the result of the measurement to the power-reception-side control unit 63.

Subsequently, the power-reception-side control unit 63 causes the first communication device 10 to transmit a communication signal including information indicating the value of power received by the power reception coil 60. The third communication device 30 receives the communication signal from the first communication device 10, and inputs, to the main-body control unit 45, the information indicating the value of power received by the power reception coil 60.

The position detection unit 70 of the main-body control unit 45 determines whether the power reception coil 60 is located within the predetermined region set in advance with respect to the heating coil, based on the value of power received by the power reception coil 60. In other words, the position detection unit 70 determines whether the power reception device 200 is placed at a proper position.

Specifically, in the case where the value of power received by the power reception coil 60 is greater than or equal to a threshold, the position detection unit 70 determines that the power reception coil 60 is located within the predetermined region set in advance with respect to the heating coil. In the case where the value of power received by the power reception coil 60 is less than the threshold, the position detection unit 70 determines that the power reception coil 60 is not located within the predetermined region set in advance with respect to the heating coil.

The main-body control unit 45 causes the main-body display unit 41 to indicate information on the result of determination by the position detection unit 70.

The mutual inductance between the heating coil and the power reception coil 60 varies in accordance with the position of the power reception coil 60 relative to the heating coil. To be more specific, in the case where the power reception coil 60 is located just above the heating coil, the area in which a high-frequency magnetic field produced from the heating coil crosses the power reception coil 60 is the maximum, and the mutual inductance is the maximum. By contrast, if the power reception coil 60 is displaced from the heating coil, the larger the amount of the displacement, the smaller the mutual inductance.

Therefore, by measuring an electromotive force and current induced in the power reception coil 60 at the time of supplying predetermined power to the heating coil, a change in mutual inductance, that is, the amount of displacement of the power reception coil 60 from the heating coil, can be detected. A specific example will be described below with reference to FIG. 22.

Figure 22:
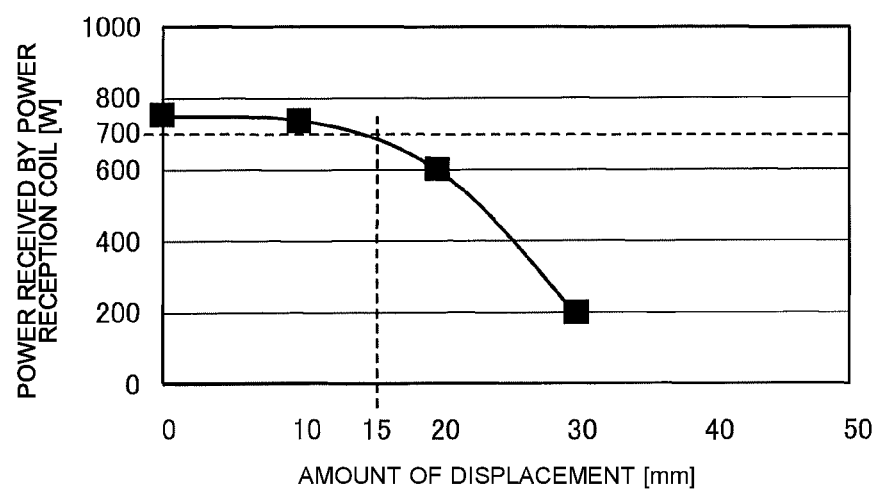
FIG. 22 illustrates an exemplary relationship between the amount of displacement and power received by a power reception coil.

FIG. 22 illustrates an exemplary relationship between the amount of displacement and power received by the power reception coil. FIG. 22 plots changes in the value of power received by the power reception coil 60 that are made as the power reception device 200 is displaced, where when the amount of displacement is 0 mm, it means that the power reception coil 60 is located just above the heating coil.

As illustrated in FIG. 22, in the case where the amount of displacement is 0 mm, when the amount of displacement is increased, with power of 750 W supplied from the induction heating cooking apparatus 100 to the power reception device 200, the power reception efficiency decreases as the amount of displacement increases. Therefore, for example, in the case where the amount of displacement is 20 mm, the power received by the power reception coil 60 decreases to 600 W. In the case where the amount of displacement is 30 mm, the power received by the power reception coil 60 decreases to 200 W.

For example, in the case where the amount by which the power reception coil 60 is displaced from the heating coil such that the amount of the reduction of the power reception efficiency in power transfer falls within the allowable range is 15 mm, 700 W is set as the threshold. Then, when the value of power received by the power reception coil 60 is greater than or equal to 700 W, the position detection unit 70 determines that the power reception device 200 is placed at a proper position. By contrast, when the value of power received by the power reception coil 60 is less than 700 W, the position detection unit 70 determines that the power reception device 200 is not placed at a proper position.

It is described above that as constant power, power of 750 W is supplied from the induction heating cooking apparatus 100 to the power reception device 200. This is an example and is not limitative. The power applied from the induction heating cooking apparatus 100 to the power reception device 200 during the position detection operation can be set to any value. For example, power of approximately 400 W may be supplied from the induction heating cooking apparatus 100 to the power reception device 200. In this case, when the power detection unit 67 detects a value less than 350 W, the position detection unit 70 determines that the power reception device 200 is not placed at a proper position.

As described above, in Embodiment 5, the position detection unit 70 determines whether the power reception coil 60 is located within the predetermined region set in advance with respect to the heating coil or not, based on the value of power received by the power reception coil 60.

Therefore, it is possible to determine whether the power reception device 200 is placed at a proper position, without using a component such as an infrared sensor or an imaging device. An inexpensive system can thus be achieved.

REFERENCE SIGNS LIST 1 first heating zone 2 second heating zone 3 third heating zone 4 top plate 10 first communication device 10a first communication device 10b first communication device 11 first heating coil 12 second heating coil 13 third heating coil 20 second communication device 20a second communication device 20b second communication device 21a to 21p receiving unit 30 third communication device 40 main-body operating unit 41 main-body display unit main-body control unit 50 inverter circuit 60 power reception coil 61 power reception circuit 62 load circuit 63 power-reception-side control unit 64 power-reception-side operating unit 67 power detection unit 70 position detection unit 71 notification unit 80 imaging device 81 position indicating element 90 ventilation control device 91 ventilator 100 induction heating cooking apparatus 200 power reception device

The invention claimed is:

1. A wireless power transfer system comprising:
an induction heating cooking apparatus including a heating coil configured to produce a high-frequency magnetic field;
a power reception device including a power reception coil configured to receive power from the heating coil;
a first communication device provided on the power reception device, and configured to transmit a communication signal;
a second communication device provided above the induction heating cooking apparatus, and configured to receive the communication signal from the first communication device; and
a notification unit configured to indicate whether the power reception coil is located within a predetermined region that is set in advance with respect to the heating coil, when the second communication device receives the communication signal from the first communication device.

2. The wireless power transfer system of claim 1, comprising
a position detection unit,
wherein the second communication device includes a plurality of receiving units, and
wherein the position detection unit is configured to cause, when a predetermined one of the plurality of receiving units receives the communication signal, the notification unit to indicate that the power reception coil is located within the predetermined region.

3. The wireless power transfer system of claim 2,
wherein the plurality of receiving units are a plurality of infrared sensors, and
wherein the first communication device transmits the communication signal upwardly, the communication signal being infrared radiation.

4. The wireless power transfer system of claim 2, comprising:
a position indicating element provided on the power reception device, the position indicating element including a mark having a predetermined color or shape; and
an imaging device provided above the induction heating cooking apparatus, and configured to capture an image of the power reception device placed on the induction heating cooking apparatus,
wherein the position detection unit determines whether the power reception coil is located within the predetermined region set in advance with respect to the heating coil, based on a position of the position indicating element in the image captured by the imaging device, and
wherein the notification unit indicates a result of determination by the position detection unit.

5. The wireless power transfer system of claim 1,
wherein the induction heating cooking apparatus includes
a third communication device configured to communicate with the second communication device,
an inverter circuit configured to supply a high-frequency current to the heating coil, and
a controller configured to control the inverter circuit based on the communication signal transmitted from the first communication device and received by the third communication device from the second communication device.

6. The wireless power transfer system of claim 1, comprising
a ventilation control device configured to control an operation of a ventilator provided above the induction heating cooking apparatus in accordance with the communication signal received by the second communication device from the first communication device.

7. The wireless power transfer system of claim 5,
wherein the power reception device includes an operating unit configured to perform an input operation for the power reception device,
wherein the first communication device transmits the communication signal, the communication signal including information on the input operation performed by the operating unit, and
wherein the controller controls an operation of the inverter circuit in accordance with the information on the input operation.

8. The wireless power transfer system of claim 6,
wherein the power reception device includes an operating unit configured to perform an input operation for the power reception device,
wherein the first communication device transmits the communication signal, the communication signal including information on the input operation performed by the operating unit, and
wherein the ventilation control device controls an operation of the ventilator in accordance with the information on the input operation.

9. A wireless power transfer system comprising:
an induction heating cooking apparatus including a heating coil configured to produce a high-frequency magnetic field;
a power reception device including a power reception coil configured to receive power from the heating coil;
a position indicating element provided on the power reception device, the position indicating element including a mark having a predetermined color or shape;
an imaging device provided above the induction heating cooking apparatus, and configured to capture an image of the power reception device placed on the induction heating cooking apparatus;
a position detection unit configured to determine whether the power reception coil is located within a predetermined region that is set in advance with respect to the heating coil, based on a position of the position indicating element in an image captured by the imaging device; and
a notification unit configured to indicate a result of determination by the position detection unit.

\* \* \* \* \*